United States Patent
Mutlu et al.

(10) Patent No.: US 8,271,741 B2
(45) Date of Patent: Sep. 18, 2012

(54) PRIORITIZATION OF MULTIPLE CONCURRENT THREADS FOR SCHEDULING REQUESTS TO SHARED MEMORY

(75) Inventors: Onur Mutlu, Kirkland, WA (US); Thomas Moscibroda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 12/265,514

(22) Filed: Nov. 5, 2008

(65) Prior Publication Data

US 2009/0216962 A1   Aug. 27, 2009

Related U.S. Application Data

(62) Division of application No. 12/037,102, filed on Feb. 26, 2008, now Pat. No. 8,180,975.

(51) Int. Cl.
*G06F 9/46* (2006.01)
*G06F 12/00* (2006.01)

(52) U.S. Cl. ........ 711/151; 711/150; 711/158; 718/101; 718/102; 718/103

(58) Field of Classification Search .............. 711/150, 711/151, 158; 718/101, 102, 103
See application file for complete search history.

(56) References Cited

U.S. PATENT DOCUMENTS

| | | | |
|---|---|---|---|
| 5,218,456 A * | 6/1993 | Stegbauer et al. | 358/404 |
| 5,630,096 A * | 5/1997 | Zuravleff et al. | 711/154 |
| 5,673,416 A | 9/1997 | Chee et al. | |
| 5,713,037 A * | 1/1998 | Wilkinson et al. | 702/33 |
| 5,745,913 A | 4/1998 | Pattin et al. | |
| 5,809,538 A | 9/1998 | Pollmann et al. | |
| 5,815,167 A | 9/1998 | Muthal et al. | |
| 6,564,304 B1 | 5/2003 | Van Hook et al. | |

(Continued)

FOREIGN PATENT DOCUMENTS

WO  WO2006117746 A1  11/2006

(Continued)

OTHER PUBLICATIONS

Bhansali, S., W.-K. Chen, S. de Jong, A. Edwards, R. Murray, M. Drinić, D. Mihočka, and J. Chau, Framework for instruction-level tracing and analysis of program executions, Proc. of the 2nd Int'l Conf. on Virtual Execution Environments, Jun. 2006, pp. 154-163, ACM, New York, NY, USA.

(Continued)

*Primary Examiner* — Kevin Ellis
*Assistant Examiner* — Mehdi Namazi
(74) *Attorney, Agent, or Firm* — Lyon & Harr, LLP; Mark A. Watson

(57) ABSTRACT

A "request scheduler" provides techniques for batching and scheduling buffered thread requests for access to shared memory in a general-purpose computer system. Thread-fairness is provided while preventing short- and long-term thread starvation by using "request batching." Batching periodically groups outstanding requests from a memory request buffer into larger units termed "batches" that have higher priority than all other buffered requests. Each "batch" may include some maximum number of requests for each bank of the shared memory and for some or all concurrent threads. Further, average thread stall times are reduced by using computed thread rankings in scheduling request servicing from the shared memory. In various embodiments, requests from higher ranked threads are prioritized over requests from lower ranked threads. In various embodiments, a parallelism-aware memory access scheduling policy improves intra-thread bank-level parallelism. Further, rank-based request scheduling may be performed with or without batching.

20 Claims, 8 Drawing Sheets

U.S. PATENT DOCUMENTS

| | | | | |
|---|---|---|---|---|
| 6,785,793 | B2* | 8/2004 | Aboulenein et al. | 711/167 |
| 6,839,797 | B2* | 1/2005 | Calle et al. | 711/5 |
| 6,944,730 | B2* | 9/2005 | Lai et al. | 711/158 |
| 6,961,834 | B2* | 11/2005 | Weber | 711/169 |
| 7,127,574 | B2* | 10/2006 | Rotithor et al. | 711/158 |
| 7,149,857 | B2* | 12/2006 | Jeddeloh | 711/158 |
| 7,178,004 | B2* | 2/2007 | Polansky et al. | 711/202 |
| 7,194,561 | B2* | 3/2007 | Weber | 710/31 |
| 7,296,112 | B1 | 11/2007 | Yarlagadda et al. | |
| 7,363,406 | B2* | 4/2008 | Chai et al. | 710/244 |
| 2005/0198413 | A1* | 9/2005 | Moyer | 710/35 |
| 2006/0136930 | A1* | 6/2006 | Kaler et al. | 718/105 |
| 2007/0283356 | A1* | 12/2007 | Du et al. | 718/102 |
| 2009/0031314 | A1* | 1/2009 | Moscibroda et al. | 718/102 |
| 2009/0044189 | A1* | 2/2009 | Mutlu et al. | 718/102 |
| 2009/0055580 | A1* | 2/2009 | Moscibroda et al. | 711/104 |
| 2009/0133032 | A1 | 5/2009 | Biles et al. | |
| 2009/0165007 | A1* | 6/2009 | Aghajanyan | 718/103 |
| 2009/0217273 | A1* | 8/2009 | Mutlu et al. | 718/101 |
| 2011/0004882 | A1 | 1/2011 | Vengerov et al. | |
| 2011/0023038 | A1* | 1/2011 | Memik et al. | 718/101 |
| 2011/0061053 | A1* | 3/2011 | Coppinger et al. | 718/102 |

FOREIGN PATENT DOCUMENTS

| | | | |
|---|---|---|---|
| WO | WO 2006117746 | A1 * | 11/2006 |
| WO | WO 2009020970 | A2 * | 2/2009 |

OTHER PUBLICATIONS

Chou, Y. and B. Fahs, and S, Abraham, Microarchitecture optimizations for exploiting memory-level parallelism, SIGARCH Comput. Archit. News, vol. 32, No. 2, Mar. 2004, pp. 76-89, ACM, New York, NY, USA.

Cuppu, V., B. Jacob, B. Davis, and T. Mudge, A performance comparison of contemporary DRAM architectures, SIGARCH Comput. Archit. News, vol. 27, No. 2, May 1999, pp. 222-233, ACM, New York, NY, USA.

Davis, B. T., Modern DRAM architectures, PH.D Thesis 2001, University of Michigan, Ann Arbor, MI, USA.

Dundas, J., and T. Mudge, Improving data cache performance by pre-executing instructions under a cache miss, Proc. of the ACM Int'l Conf. on Supercomputing, pp. 176-186, Jul. 1997, ACM, New York.

Frank, H., Analysis and optimization of disk storage devices for time-sharing systems, J. ACM, vol. 16, No. 4, Oct. 1969, pp. 602-620, ACM, New York, NY, USA.

Gabor, R., and S. Weiss and A. Mendelson, Fairness and throughput in switch on event multithreading, Proc. of the 39th Annual IEEE/ACM Int'l Symposium on Microarchitecture, Dec. 2006, pp. 149-160, IEEE Computer Society.

Glew, A., MLP yes! ILP no!, Architectural Support for Programming Languages and Operating Systems, Wild and Crazy Idea Session, Oct. 1998.

Hur, I. and C. Lin, Adaptive history-based memory schedulers, Proc. of the 37th Annual IEEE/ACM Int'l Symposium on Microarchitecture, Dec. 2004, pp. 343-354, IEEE Computer Society, Washington, DC, USA.

Jacobson, D. M. and J. Wilkes, Disk scheduling algorithms based on rotational position, Technical Report HPLCSP917rev1, HP Labs, Mar. 1991.

Karkhanis, T., and J. E. Smith, A day in the life of a data cache miss, Proc. 2nd Annual Workshop on Memory Performance Issues, May 2002.

Kim, S., D. Chandra and Y. Solihin, Fair cache sharing and partitioning in a chip multiprocessor architecture, PACT '04: Proc. of the 13th Int'l Conf. on Parallel Architectures and Compilation Techniques, Sep.-Oct. 2004, pp. 111-122, IEEE Computer Society, Washington, DC, USA.

Kroft, D., Lockup-free instruction fetch/prefetch cache organization, Proc. of the 8th Annual Symposium on Computer Architecture, May 1981, pp. 81-87, IEEE Computer Society Press, Los Alamitos, CA, USA.

Lin, T.-C., K.-B. Lee, and C.-W. Jen, Quality-aware memory controller for multimedia platform SoC, IEEE Workshop on Signal Processing Systems, Aug. 2003, pp. 328-333.

Luk, C.-K., R. Cohn, R. Muth, H. Patil, A. Klauser, G. Lowney, S. Wallace, V. J. Reddi, and K. Hazelwood, Pin: Building customized program analysis tools with dynamic instrumentation, Proc. of the 2005 ACM SIGPLAN Conf. on Programming Language Design and Implementation, Jun. 2005, pp. 190-200, ACM Press.

Luo, K., J. Gummaraju and M. Franklin, Balancing throughput and fairness in SMT processors, Int'l Symposium on Performance Analysis of Systems and Software, pp. 164-171, Nov. 2001.

Macián, C., S. Dharmapurikar, and J. Lockwood, Beyond performance: Secure and fair memory management for multiple systems on a chip, Proc. of the IEEE Int'l Conf. on Field-Programmable Technology, Dec. 2003, pp. 348-351, Tokyo, Japan.

McKee, S. A., W. A. Wulf, J. H. Aylor, R. H. Klenke, M. H. Salinas, S. I. Hong, and D. A. B. Weikle, Dynamic access ordering for streamed computations, IEEE Transactions on Comp., Nov. 2000, vol. 49, No. 11, pp. 1255-1271.

Mutlu, O., J. Stark, C. Wilkerson, and Y. N. Patt, Runahead execution: An alternative to very large instruction windows for out-of-order processors, Proc. Int'l Symp. High Performance Architecture, Feb. 2003, pp. 129-140.

Mutlu, O., H. Kim, and Y. N. Patt, Efficient runahead execution: Power-efficient memory latency tolerance, IEEE Micro, vol. 26, No. 1, Jan./Feb. 2006, pp. 10-20.

Natarajan, C., B. Christenson, and F. Briggs, A study of performance impact of memory controller features in multi-processor server environment, Proc. of the 3rd Workshop on Memory Performance Issues, Jun. 2004, pp. 80-87, ACM, New York, NY, USA.

Nesbit, K. J., N. Aggarwal, J. Laudon, and J. E. Smith, Fair queuing memory systems, Proc. of the 39th Annual IEEE/ACM Int'l Symposium on Microarchitecture, Dec. 2006, pp. 208-222, IEEE Computer Society, Washington, DC, USA.

Patil, H., R. S. Cohn, M. Charney, R. Kapoor, A. Sun, and A. Karunanidhi, Pinpointing representative portions of large Intel® Itanium® programs with dynamic instrumentation, pp. 81-92, 37th Annual Int'l Symposium on Microarchitecture, Dec. 2004, IEEE Computer Society, Washington, DC, USA.

Qureshi, M. K., D. N. Lynch, O. Mutlu and Y. N. Patt, A case for MLP-aware cache replacement, Proc. of the 33rd Annual Int'l Symposium on Comp. Architecture, May 2006, pp. 167-178, IEEE Computer Society, Washington, DC, USA.

Rixner, S., Memory controller optimizations for web servers, Proc. of the 37th Annual IEEE/ACM Int'l Symposium on Microarchitecture, Dec. 2004, pp. 355-366, IEEE Computer Society, Washington, DC, USA.

Rixner, S., W. J. Dally, U. J. Kapasi, P. Mattson, and J. D. Owens, Memory access scheduling, Proc. of the 27th Annual Int'l Symposium on Computer Architecture, vol. 28, No. 2, May 2000, ACM, New York, NY, USA.

Schwaderer, D., and P. Martin, Solving SOC shared memory resource challenges, Sonics Inc., Jun. 2003, retrieved Nov. 30, 2007 from http://www.us.design-reuse.com/articles/5816/solving-soc-shared-memory-resource-challenges.html.

Shao, J. and B. T. Davis, A burst scheduling access reordering mechanism, Proc. of the 2007 IEEE 13th Int'l Symposium on High Performance Comp. Architecture, Feb. 2007, pp. 285-294, IEEE Computer Society, Washington, DC, USA.

Sonics Inc., Sonics MemMax 2.0 multi-threaded DRAM access scheduler, DataSheet, Sonics, Inc., Jun. 2006, pp. 1-6, retrieved Nov. 30, 2007 from http://www.sonicsinc.com/download_doc.php?doc=MemMax2datasheet0906.pdf.

Smith, J. E. and A. R. Pleszkun, Implementation of precise interrupts in pipelined processors, Implementation of precise interrupts in pipelined processors, The 12th Annual Int'l Symposium on Computer Architecture, pp. 36-44, Jun. 1985.

Smith, W. E., Various optimizers for single-stage production, Naval Research Logistics Quarterly, vol. 3, No. 1-2 Mar.-Jun. 1956, pp. 59-66.

Snavely, A., D. M. Tullsen, Symbiotic jobscheduling for a simultaneous multithreading processor, ASPLOS-IX Proc. of the 9th Int'l Conf. on Architectural Support for Programming Languages and Operating Systems, pp. 234-244, Nov. 12-15, 2000, Cambridge, MA, USA.

Suh, G. E., S. Devadas and L. Rudolph, A new memory monitoring scheme for memory-aware scheduling and partitioning, Proc. of the 8th Int'l Symposium on High-Performance Computer Architecture, Feb. 2002, pp. 117-128, IEEE Computer Society, Washington, DC, USA.

Teorey, T. J. and T. B. Pinkerton, A comparative analysis of disk scheduling policies, Commun. of the ACM, vol. 15, No. 3, Mar. 1972, pp. 177-184, ACM, New York, NY, USA.

Tomasulo, R. M., An efficient algorithm for exploiting multiple arithmetic units, IBM Journal of Research and Development, vol. 11, No. 1, Jan. 1967, IBM Corp., Riverton, NJ, USA.

Zhang, Z., Z. Zhu and X. Zhang, A permutation-based page interleaving scheme to reduce row-buffer conflicts and exploit data locality, Proc. of the 33rd Annual Int'l Symposium on Microarchitecture, Dec. 10-12, 2000, pp. 32-41, ACM Press.

Zhu, Z., and Z. Zhang, A performance comparison of DRAM memory system optimizations for SMT processors, Proc. of the 11th Int'l Symposium on High-Performance Comp. Architecture, Feb. 2005, San Francisco, CA.

Namazi, Mehdi, Office Action, U.S. Appl. No. 12/037,102, Jun. 6, 2011.

Namazi, Mehdi, Office Action, U.S. Appl. No. 12/037,102, Sep. 28, 2011.

* cited by examiner

PRIORITIZATION OF MULTIPLE CONCURRENT THREADS FOR SCHEDULING REQUESTS TO SHARED MEMORY

CROSS REFERENCE TO RELATED APPLICATIONS

This application is a Divisional Application of U.S. patent application Ser. No. 12/037,102, filed on Feb. 26, 2008, by Moscibroda, et al., and entitled "CONTROLLING INTERFERENCE IN SHARED MEMORY SYSTEMS USING PARALLELISM-AWARE BATCH SCHEDULING," and claims the benefit of that prior application under Title 35, U.S. Code, Section 120.

BACKGROUND

1. Technical Field

A "request scheduler" provides techniques for reducing delay in servicing requests from executing threads in a computer system with shared memory, and in particular, various techniques for dynamically batching and scheduling concurrent requests in parallel to reduce overall request pendency in a multi-threaded environment for improving overall memory performance.

2. Related Art

Many conventional general-purpose computers include one or more microprocessors, with each microprocessor containing one or more processing cores. In such systems, each core may also be capable of executing multiple threads. Typically, in addition to any L1 or L2 processor memory, such general-purpose computers include one or more banks of shared memory, such as DRAM or SRAM, for example. A memory controller typically provides access to the shared system-level memory by scheduling thread requests issued by one or more processing cores in response to instructions from applications or from the operating system. Unfortunately, concurrent requests to the system level memory coming from one or more processor cores and/or from one or more simultaneous or parallel threads often cause conflicting memory requests that interfere with each other. Such conflicts tend to degrade overall system performance.

In general, system level memory such as DRAM, for example, is organized into multiple banks such that memory requests to different banks can be serviced in parallel. Each DRAM bank has a two-dimensional structure, consisting of multiple rows and columns. Consecutive addresses in memory are located in consecutive columns in the same row. Each memory bank generally has one row-buffer and data can only be read from that buffer. The row-buffer contains at most a single row at any given time. Therefore, due to the existence of the row-buffer, access to one or more specific memory addresses in response to a thread request generally falls into one of three categories. Specifically, these categories include: 1) "Row hit" requests, where the current request is to the row that is already in the row-buffer; 2) "Row conflict" requests, where the current request is to a row different from the one that is currently in the row-buffer; and 3) "Row closed" requests, where for any of a number of reasons, there is currently no row of memory stored in the row-buffer.

Conventional memory controllers (either integrated into a processor or implemented as a separate attached component) generally include memory access schedulers designed to maximize the bandwidth obtained from the system level memory in order to improve overall system performance. For example, a simple solution to the memory request problem may use a scheduling algorithm that serves memory requests based on a "First-Come-First-Serve" (FCFS) policy. However, as is well known to those skilled in the art, a pure FCFS-based memory access scheduler can be very inefficient since it typically incurs a large number of row conflicts when accessing the system level memory.

Instead, many conventional memory access schedulers employ a "First-Ready First-Come-First-Serve" (FR-FCFS) algorithm to schedule thread requests to access particular system memory addresses. FR-FCFS-based memory access schedulers generally prioritize thread requests to a particular memory bank by first giving higher priority to requests that would be serviced faster (i.e., requests for a memory location in the same memory row that is already open in the row buffer, also referred to as a "row-hit-first" rule). In other words, higher priority is assigned to requests that would result in a row hit over ones that would cause a row conflict. Further, once the row-hit-first rule has been evaluated to prioritize pending requests, typical request schedulers then give a next higher priority to any remaining requests that arrived earliest for a particular memory bank (i.e., an "oldest-within-bank-first" rule).

In other words, conventional FR-FCFS algorithms typically attempt to maximize system level memory bandwidth by scheduling memory access requests that cause row hits first (regardless of when these requests have arrived) within a particular memory bank. Hence, streaming memory access patterns are given the highest priority by the memory controller, and are served first. Then, the oldest requests for memory access to the same memory bank among any remaining requests are given the next highest priority and are served in the order received. Therefore, the oldest row-hit memory request has the highest priority. In contrast, the youngest row-conflict memory request has the lowest priority.

As the number of cores in computer processors increase, and as operating systems and applications make greater use of multi-threading and hyper-threading based techniques, the number of concurrent requests to system level memory banks will increase. Consequently, the present abilities of conventional memory controllers to efficiently schedule thread requests for access to system level memory in such environments can cause bottlenecks in overall system performance due to interference between thread requests.

As is known to those skilled in the art, interference of threads/applications in a shared memory system of a general purpose computer can result in a number of serious problems. For example, if scheduling and resource allocation policies result in inter-thread interference in the shared memory controller, such interference can cause loss of control by the operating system scheduler or the hypervisor (i.e., a "virtual machine" monitor) over the system's performance and fairness properties. Another potential problem is that such interference can cause significant inefficiency and loss of control in data centers due to unpredictable and uncontrollable memory system performance. Yet another potential problem is that such interference can cause degraded system performance and significant user-productivity loss. In addition, such interference can cause unpredictable application program performance, which renders performance analysis, optimization, and isolation extremely difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "request scheduler" is applicable for use in reducing thread request pendency in any conventional shared memory system (also referred to herein as either "shared system level memory" or simply "shared memory"). Shared memory systems include general purpose computers wherein concurrent requests to access shared system memory, such as system DRAM, SRAM, flash memory, or any other type of shared system level memory, must be scheduled or otherwise ordered by a memory controller or the like.

As described in detail herein, the request scheduler provides a software controllable hardware mechanism in the form of a memory controller, or as a new element within an existing memory controller, that uses various techniques for batching and/or scheduling thread requests in parallel for access to shared system level memory in a general-purpose computer system.

Note that in various embodiments, the memory controller of the request scheduler is either integrated directly into a microprocessor or implemented as a separate attached component between the microprocessor cores and the shared system level memory. In either case, operation of the request scheduler is generally the same.

More specifically, in various embodiments, the request scheduler uses the concept of "request batching" to consecutively group outstanding requests from a memory request buffer into larger units termed "batches." Each request that is included in a batch is "marked" or otherwise identified as being included in the current batch. In general, each "batch" includes some maximum number of requests that are marked for inclusion in the current batch (referred to herein as a "marking cap") for each bank and for some or all concurrent threads, with the marking cap being either fixed or variable in various embodiments. Then, when a batch is formed by the request scheduler, that batch will include up to marking cap number of requests from each thread for each memory bank of the shared system level memory. Requests from each thread are selected for inclusion in a batch based on age, with oldest requests in each thread being selected first.

After a batch is formed, the requests in that batch are serviced from the appropriate location in the shared memory, e.g., from the appropriate DRAM bank in a DRAM memory system. Further, in various embodiments, the request scheduler prioritizes all requests in the current batch above all other requests so that the requests in the current batch are serviced prior to any other requests. Then, once some or all of the requests in a current batch have been serviced, the request scheduler forms a new batch of requests from additional requests in the memory request buffer (including any remaining or new requests of each thread, and including any new threads).

In addition to the concept of "batching," in various embodiments, the request scheduler also provides various techniques for scheduling requests. For example, in one embodiment, requests in the current batch are scheduled to preserve thread parallelism in addressing the different memory banks of the shared memory while simultaneously considering other criteria such as row-hit criteria for each memory request.

In particular, in various embodiments, a parallelism-aware "rank" is computed for each thread having requests in the current batch. This rank provides a score that that is used to order threads within a particular batch for maximizing "intra-thread bank-level parallelism." The scheduler maximizes intra-thread bank parallelism by servicing each thread's memory requests to different banks as much in parallel as possible. In other words, in various embodiments, rather than simply service the batched requests based only on conventional scheduling criteria, such as row-hit criteria, the request scheduler simultaneously optimizes row-hit criteria and intra-thread bank-level parallelism within each batch.

It should also be noted that the concepts of request scheduling by simultaneously optimizing row-hit criteria and intra-thread bank-level parallelism can also be used without the concept of batching. In particular, in various embodiments, the request scheduler directly schedules requests from the memory request buffer without having them first arranged into batches. In this case, threads are ranked (without first batching the threads) by computing the parallelism-aware rank for each thread as noted above. Again, this rank provides a score that is used to order thread servicing for maximizing intra-thread bank-level parallelism. Then, given the rank for each thread, the request scheduler simultaneously optimizes row-hit criteria and intra-thread bank-level parallelism to improve overall performance of the shared memory of the general-purpose computer system.

In view of the above summary, it is clear that the request scheduler described herein provides a variety of unique techniques for batching and scheduling thread requests for access to the shared memory in order to reduce overall request pendency. In addition to the just described benefits, other advantages of the request scheduler will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE EMBODIMENTS

Figure 1:
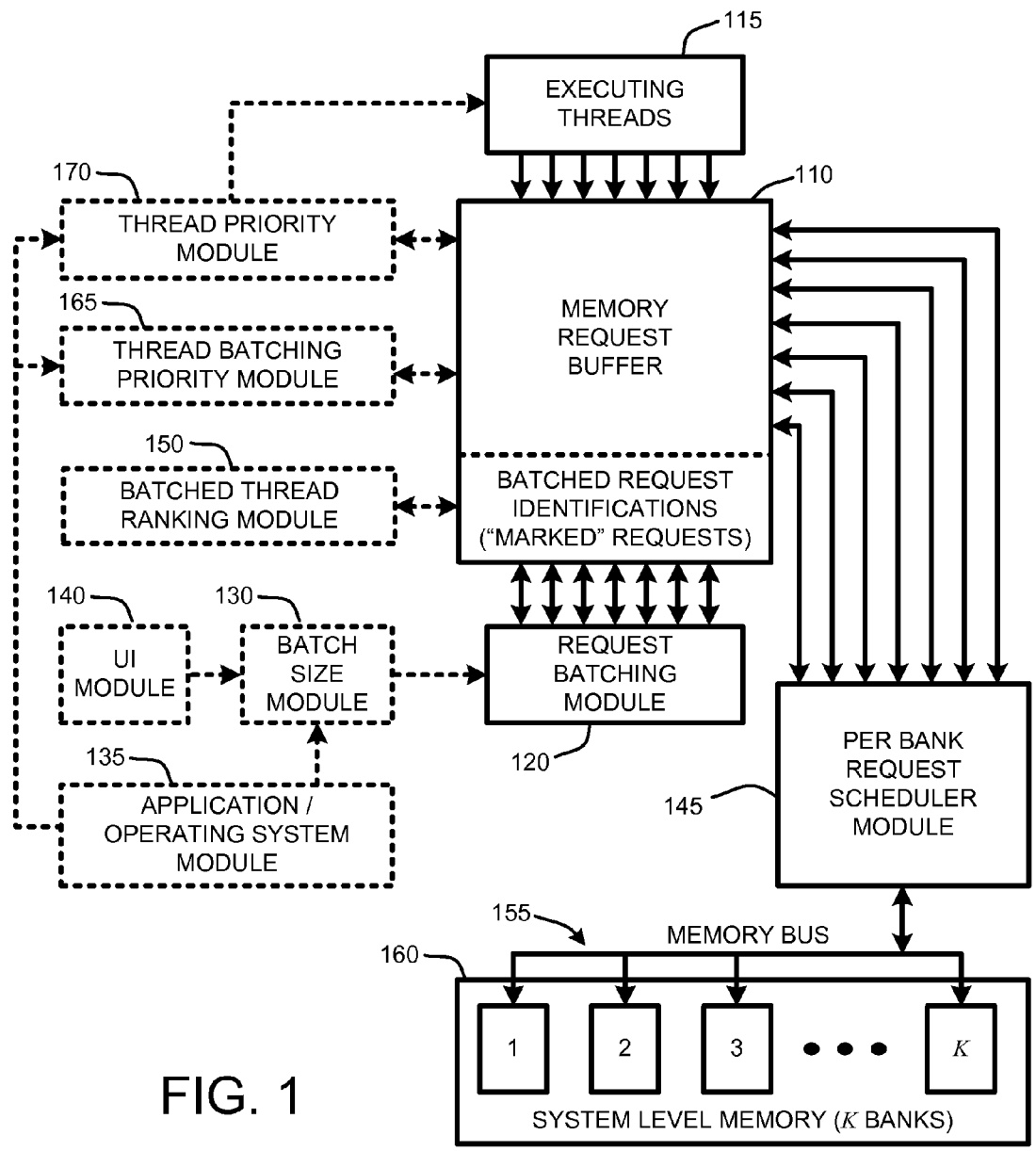
FIG. 1 provides an exemplary architectural flow diagram that illustrates program modules for implementing various embodiments of a request scheduler, as described herein.

In the following description of the embodiments of the present invention, reference is made to the accompanying drawings, which form a part hereof, and in which is shown by way of illustration specific embodiments in which the invention may be practiced. It is understood that other embodiment may be utilized and structural changes may be made without departing from the scope of the present invention.

1.0 Introduction:

As is well known to those skilled in the art, a shared memory system is one in which one or more memory banks of a system level memory component (such as system DRAM, SRAM, flash memory, etc.) are accessed concurrently by requests from multiple threads of execution (with each thread generating one or more requests to access the shared memory). Multiple concurrent threads are typically seen in general-purpose computers, including multi/many-core systems, multi-threaded (e.g. hyper-threaded or simultaneously-multi-threaded) systems, and conventional multi-processor systems. However, conventional single-core general-purpose computers can also execute multiple threads simultaneously on the same CPU (with the various threads sharing the system level memory) depending upon the operating system and/or applications being run.

In general, a "request scheduler," as described herein, provides various techniques for batching and/or scheduling thread requests for access to the shared memory of a general-purpose computer system in order to reduce overall request pendency. The request scheduler is applicable for use in any general-purpose computer system having one or more CPU's with one or more processing cores in which concurrently executing threads must share one or more banks of the system level memory.

More specifically, in various embodiments, the request scheduler provides thread-fairness while preventing short- and long-term thread starvation by using a concept referred to herein as "request batching." This "batching" consecutively groups outstanding requests from a memory request buffer of the general-purpose computer into larger units termed "batches." Each "batch" includes some maximum number of requests for each bank of the shared memory and for some or all concurrent threads.

Further, within a batch, the request scheduler explicitly reduces average thread stall times by using computed thread rankings in scheduling request servicing from the shared memory. For example, in one embodiment, this ranking uses a parallelism-aware memory access scheduling policy that improves intra-thread bank-level parallelism. In general, "intra-thread bank-level parallelism" means that where a particular thread has two or more requests to different memory banks, the request scheduler will attempt to schedule those requests to access the separate memory banks simultaneously (i.e., in parallel). Note that the various embodiments of rank-based request scheduling described herein can be performed either with or without batching to improve overall system performance.

1.1 System Overview:

As noted above, the request scheduler provides various techniques for batching and scheduling thread requests for access to the shared memory in order to reduce overall request pendency.

As described in further detail in Section 2, the concept of "batching" consecutively groups outstanding requests from threads in a memory request buffer into larger units termed "batches." Requests from particular threads are selected based on the requests' arrival time in the thread (with older requests in a particular thread being selected before newer requests in a particular thread. Requests in a batch are then given priority over other non-batched requests. In general, each "batch" includes requests for some, or all, concurrent threads for each memory bank, with some maximum number of requests (on a per bank basis) being set for each batch.

Regardless of how many threads are represented in a particular batch, within a batch, the request scheduler explicitly reduces average thread stall times by using computed "thread rankings" in scheduling request servicing from the shared memory. In one embodiment, this ranking uses a parallelism-aware memory access scheduling policy that improves intra-thread bank-level parallelism. For example, assuming that two or more requests associated with a particular thread in the current batch are requesting memory access from different memory banks, the request scheduler will order those requests, based on the computed rank associated with each thread, such that requests of each particular thread to different banks are executed in parallel as much as possible. Further, it should also be noted that, as described in further detail herein, rank-based request scheduling can also be performed either with or without batching to improve overall system performance.

The effect of this rank-based scheduling is that different threads, whether or not batching has been applied, are prioritized in the same order across all banks such that the requests of each of those threads are more likely to be serviced in parallel by all banks. In the case of batching, in various embodiments, either only those threads represented in the current batch are ranked or all threads are ranked, while in the case of no batching, threads are ranked directly based on the state of the memory request buffer. In either case, the result of rank-based ordering of requests on a per-thread basis is that individual threads will tend to be serviced quicker than if particular requests are serviced based only on a conventional row-hit/row-conflict basis, or on other criteria such as the request arrival time.

In other words, in various embodiments, rather than simply service the requests based only on conventional scheduling criteria, such as row-hit criteria, parallelism-aware thread ranking allows the request scheduler to simultaneously optimize row-hit criteria and intra-thread bank-level parallelism of the requests. Further, it should also be noted that instead of computing the parallelism-aware rank for each thread as described above (with or without batching), in various embodiments, thread ranking may also be based on other ranking criteria that is then jointly evaluated with row-hit criteria for scheduling request servicing. For example, in one embodiment, thread ranking is based on a "shortest-job-first" scheduling principle, where threads having the fewest requests are given a higher ranking. These and other ranking embodiments are discussed in further detail in Section 2.

In addition, it should also be noted that in various embodiments, once a batch is created, servicing of the requests in that batch can use any request scheduling techniques desired. For example, it has been observed that the concept of batching, when used in combination with conventional scheduling techniques, such as, for example a conventional "First-Ready First-Come-First-Serve" (FR-FCFS) algorithm, serves to improve overall shared memory performance relative to using the conventional scheduling technique without the batching techniques described herein.

1.2 System Architectural Overview:

The processes summarized above are illustrated by the general system diagram of FIG. 1. In particular, the system diagram of FIG. 1 illustrates the interrelationships between program modules for implementing various embodiments of the request scheduler, as described herein. Furthermore, while the system diagram of FIG. 1 illustrates a high-level view of various embodiments of the request scheduler, FIG. 1 is not intended to provide an exhaustive or complete illustration of every possible embodiment of the request scheduler as described throughout this document.

In addition, it should be noted that any boxes and interconnections between boxes that are represented by broken or dashed lines in FIG. 1 represent alternate embodiments of the request scheduler described herein, and that any or all of these alternate embodiments, as described below, may be used in combination with other alternate embodiments that are described throughout this document.

In general, as illustrated by FIG. 1, the processes enabled by the request scheduler begin operation by populating a memory request buffer 110 with incoming requests from executing threads 115 (i.e., threads executing on a processor core generate the incoming requests for access to the shared memory). Assuming that batching is to be performed (as described in further detail in Section 2.4), a request batching module 120 then forms a batch of requests from the threads 115 in the memory request buffer 110 by "marking" or setting bits in an extra register added to each entry of the memory request buffer.

More specifically, as described in Section 2.4, in one embodiment, the extra register in each entry of the memory request buffer is "marked" with a "1" for batched requests, or "0" otherwise. However, it should also be noted that in a related embodiment, a separate batch buffer or the like (not shown in FIG. 1) could be used to hold batched requests. However, the loss of efficiency in using a separate buffer for storing batched requests could make this embodiment less attractive since it requires requests to be copied from the memory request buffer 110 to the separate batch buffer prior to servicing of requests.

In one embodiment, as described in further detail in Section 2.4, a batch size module 130 is used to set a maximum size for batches on a per-thread per-bank basis. In other words, the maximum batch size (also referred to herein as a "marking cap") limits the total number of requests that any one thread can contribute to the current batch for any particular bank of the shared memory. Note that this making cap number does not limit the number of threads that can be represented in the current batch. In one embodiment, this marking-cap value is set by an application/operating system module 135 (which include system software such as, for example, applications, operating system, hypervisor, virtual machine monitor, etc.). In a related embodiment, end-users are able to tune batch size and performance by setting a desired marking cap value via a UI module 140 that provides a simple user interface for setting the maximum batch size. Further, in some embodiments, individual threads may have different marking-cap values, depending upon the importance or priority of the particular threads.

Once a batch has been formed (or marked) by the request batching module 120, the requests in that batch are serviced by a per-bank request scheduler module 145. In general, the per-bank request scheduler module 145 can use any desired request scheduling technique (as described in detail in Section 2.5) for scheduling the batched requests. However, in various embodiments, threads represented in the current batch are ranked by a batched thread ranking module 150. Note that as described herein, requests from the current batch are prioritized over other non-batched requests such that the batched requests will generally be scheduled before non-batched requests. In general, the batched thread ranking module 150 provides various techniques for ranking threads. In various embodiments, this ranking is used to compute a priority score or the like that is used to schedule the order of request servicing in a particular batch in order to maximize intra-thread bank-level parallelism for batched requests.

Once a request is selected for servicing, the per-bank request scheduler module 145 passes the request on to a conventional memory bus 155 (typically via a conventional across-bank scheduler or the like (not shown in FIG. 1) for servicing the requests from the appropriate bank of system level memory 160. Further, once a particular request is serviced, it is removed from the memory request buffer 110. Once the current batch is empty (i.e., all requests in the current batch have been serviced), the request batching module 120 then forms a new batch of requests from the memory request buffer 110 and repeats the processes described above for servicing the batched requests.

In additional embodiments, the request scheduler includes a thread batching priority module 165 that is used to set how frequently requests from a particular thread will be included in a batch. For example, threads having the highest batching priority will be included in every batch, while threads having a lower batching priority will not be included in every batch. In this way, threads that are considered to be the most important are serviced quicker since requests in those threads are always batched, and since batched requests are serviced prior to non-batched requests. Note that setting the batching priority for particular threads is performed under direction of the application/operating system module 135. Note that the concept of "batching priorities" is described further detail in Section 2.6.

Finally, a separate thread priority module 170 is also included in various embodiments of the request scheduler. In contrast to the thread batching priority module 165 which determines how often threads will be batched, the thread priority module 170 sets a priority for threads that directly prioritizes which thread's requests will be serviced first, either within a batch, or directly from the memory request buffer 110 in the case that batching is not used.

2.0 Operation Overview:

The above-described program modules are employed for implementing various embodiments of the request scheduler. As summarized above, the request scheduler provides various techniques for batching and scheduling thread requests for access to the shared memory in order to reduce overall request pendency. The following sections provide a detailed discussion of the operation of various embodiments of the request scheduler, and of exemplary methods for implementing the program modules described in Section 1 with respect to FIG. 1.

2.1 Operational Details of the Request Scheduler:

In general, the request scheduler provides various techniques for batching and scheduling thread requests for access to the shared memory in order to reduce overall request pendency. The following paragraphs provide an example of conventional DRAM operation in a shared memory system, and provide details of various embodiments of the request scheduler, including: an overview of prior art DRAM operation in a shared memory system; an overview of the request scheduler; request batching; ranking-based scheduling; and additional embodiments and considerations.

Further, it should be noted that that neither the marking/batching logic described in Section 2.4, nor the ranking logic described in Section 2.5 is on the critical path of the CPU of the general-purpose computer. In particular, an on-chip DRAM controller (or other memory controller) runs at a higher frequency than the DRAM (or other shared memory) and needs to make a scheduling decision only every memory cycle. Further, if needed, the marking/ranking logic can take multiple cycles since marking/ranking is done only when a new batch is formed.

2.2 Overview of DRAM Operation in a Shared Memory System:

The following paragraphs generally describe conventional access to shared memory in the context of conventional DRAM based memory systems. However, it must be understood that the use of DRAM as an example is provided only for purposes of explanation relative to a particular memory type. As such, any discussions regarding DRAM provided herein are not intended to limit the scope of the request scheduler to DRAM based memory systems. In fact, as noted above, the request scheduler is applicable for use with any type of shared memory (e.g., shared DRAM, SRAM, flash memory, or any other type of shared system memory) in a general purpose computer wherein concurrent memory requests must be scheduled or otherwise ordered by a memory controller or the like.

2.2.1 Executing Multiple Threads on the Same Computer Processor:

In general, a "core" in a typical central processing unit (CPU) or microprocessor includes instruction processing pipelines (integer and floating-point), instruction execution units, and L1 instruction and data caches. Many general-purpose computers manufactured today include two or more separate but identical cores. Further, in some systems (e.g., systems based on CPUs including, for example, AMD® Athlon®, Turion®, and Opteron®, Intel® Pentium-D®, etc.), each core has its own private L2 cache, while in other general-purpose computer systems (e.g., systems based on CPUs including Intel® Core Duo®, IBM® Power 4/5, etc.) the L2 cache is shared between different cores. However, regardless of whether or not the L2 cache is shared, the DRAM Memory System of conventional multi-core systems is shared among all cores. The result of this sharing is that memory requests from different threads executing on different cores can interfere with each other in the DRAM memory system.

Figure 2:
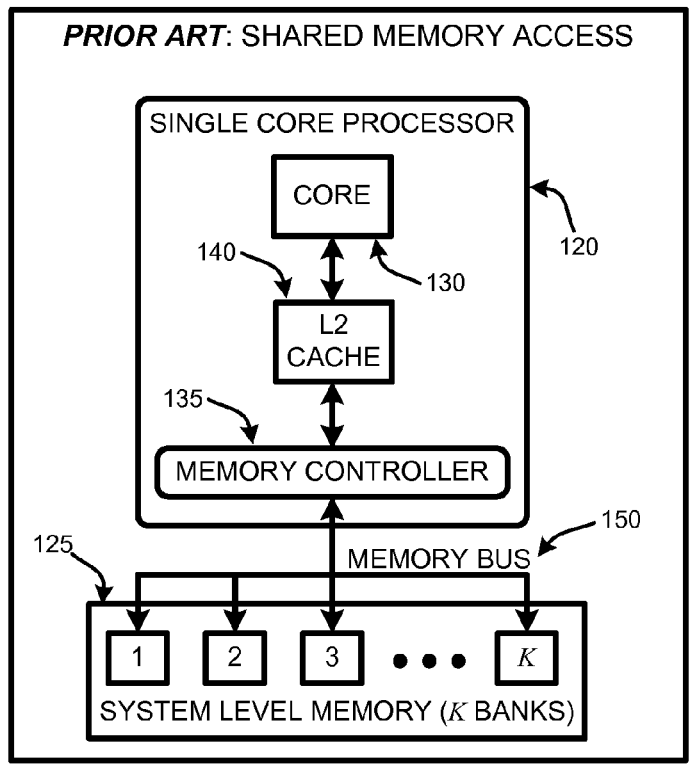
FIG. 2 illustrates a prior art example of a simplified high-level architecture of a single-core general-purpose computer having an integrated memory controller.

As illustrated by the prior art FIG. 2, a typical DRAM memory system generally consists of three major components: 1) the DRAM banks (i.e., the banks of system level memory 125) that store the actual data; 2) the DRAM controller (also referred to as a memory controller 135) that schedules commands to read/write data from/to the DRAM banks 125; and 3) DRAM address/data/command buses (i.e., the "memory bus" 150 that connects the DRAM banks and the DRAM controller.

More specifically, FIG. 2 shows a prior art example of a simplified high-level architecture of a single-core 120 general-purpose computer having an integrated memory controller 135. In general, the processor core 130 sends one or more threads having memory requests to the memory controller 135 via an L2 cache. The memory controller 135 then schedules the requests of the various threads for access to the various banks (e.g., memory banks 1, . . . K) of the shared memory 125 via a memory bus 150. Note that in many systems, the memory controller 135 is need integral to the processor 120. However, the functionality of the memory controller 135, whether integral to the processor 120 or external to the processor, is generally similar.

Figure 3:
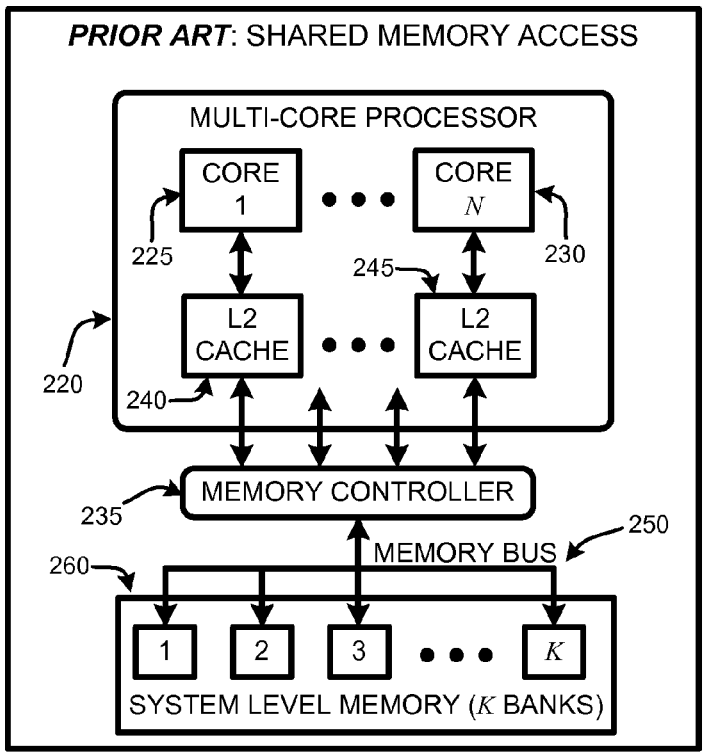
FIG. 3 illustrates a prior art example of a simplified high-level architecture of a multi-core general purpose computer having an arbitrary number of cores (also referred to herein as an "$I$-core" processor) and having a memory controller connected to the microprocessor.

Similarly, FIG. 3 shows a simplified prior art example of a high-level architecture of a multi-core 220 general purpose computer having an arbitrary number of cores 225, 230 (also referred to herein as an "$I$-core" processor) and having an external memory controller 235. In general, one or more of the processor cores 225, 230, sends one or more memory requests of the executing threads to the memory controller 235 via a corresponding L2 cache, 240, 245. The memory controller 235 then schedules the incoming requests of the various threads for access to the various banks (e.g., memory banks 1, . . . K) of the shared memory 260 via a memory bus 250.

It should be noted that even though multi-core architectures are discussed in the following examples, other architectures can also execute multiple threads simultaneously on the same chip (sharing the DRAM memory system). Examples of such architectures include multi-threaded or simultaneous multi-threading (or hyper-threading) architectures. Therefore, request scheduler described herein is not limited to multi-core architectures, but is applicable for use in any computer system in which concurrently executing threads share the DRAM memory system (or other shared memory type).

Further, it should also be noted that in the case of the request scheduler described herein, the memory controller (e.g., 135 or 235 of FIG. 2 and FIG. 3, respectively) is modified to perform the batching and/or scheduling techniques described herein. This applies to the case of both integral memory controllers and external memory controllers. Consequently, it should be understood that a modified memory controller that is capable of implementing the functionality of the request scheduler is easily adapted for use with existing computer processor technology and memory controllers without the need to change the existing memory or the existing memory bus. Further, in the case where the memory controller is not integrated into the CPU, the request scheduler can also be implemented with existing CPU's without the need to modify those CPUs. Finally, even for existing CPU's having integrated memory controllers, the only portion of the CPU that would need to be modified to implement the request scheduler techniques described herein is the circuitry containing the memory controller unit of the CPU. As such, changes to other logic units of the CPU are not required, thereby making the request scheduler described herein both very flexible, and very easy to implement within existing components of a typical general-purpose computer system.

2.2.2 DRAM Memory Systems:

As noted above, a typical shared memory system, such as a DRAM memory system, generally includes three major components: 1) the memory banks of the shared system level memory; 2) the memory controller for scheduling read/write requests to the various memory banks; and 3) a memory bus that connects the memory banks to the memory controller.

Figure 4:
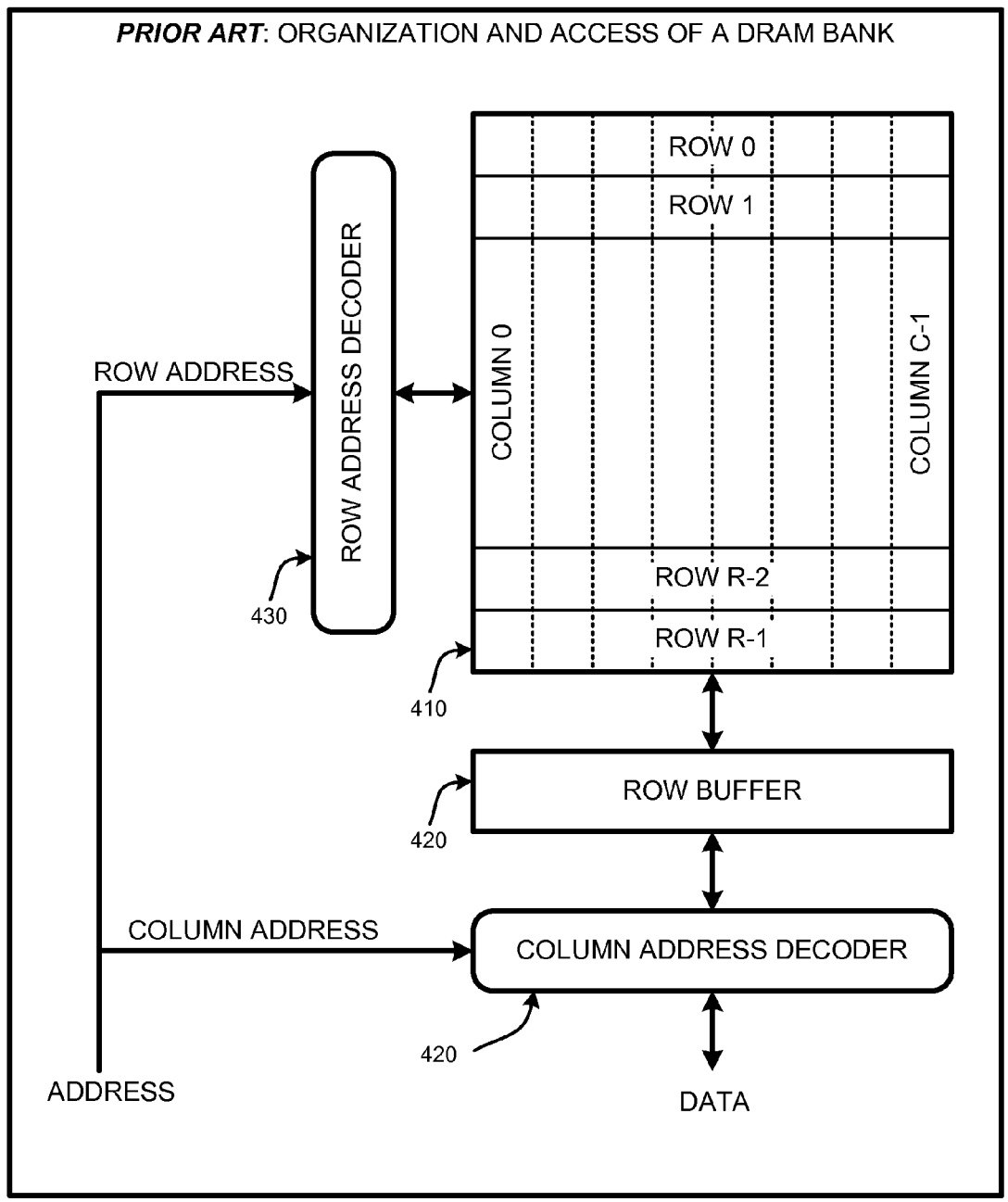
FIG. 4 illustrates a prior art example of a high-level architecture showing organization and access for a typical DRAM memory bank.

As illustrated by the prior art FIG. 4, a typical DRAM memory system is organized into multiple banks such that memory requests to different banks can be serviced in parallel. Each DRAM bank 410 has a two-dimensional structure, consisting of multiple rows and columns. Consecutive addresses in memory are located in consecutive columns in the same row. The size of a row varies, but it is usually between 1-32 Kbytes in commodity DRAMs. In other words, in a system with 32-byte L2 cache blocks, a row contains 32-1024 L2 cache blocks.

Each bank has one row-buffer 420 and data can only be read from this buffer. The row-buffer contains at most a single row of the memory bank 410 at any given time. Due to the existence of the row-buffer, modern DRAMs are not truly random access (equal access time to all locations in the memory array). Instead, depending on the access pattern to a bank, a DRAM access can fall into one of the three following categories:

1. "Row Hit" Memory Access Request: The access (memory request) is to the row that is already in the row-buffer 420. The requested column is read from or written into the row-buffer (called a column access). This case results in the lowest latency memory access. Note that sequential or streaming memory access patterns (e.g., accesses to cache blocks A, A+1, A+2, . . . ) result in row hits since the accessed cache blocks are in consecutive columns in a row. Such requests can therefore be handled relatively quickly.
2. "Row Conflict" Memory Access Request: The access (memory request) is to a row different from the one that is currently in the row-buffer 420. In this case, the row in the row-buffer first needs to be written back into the memory bank 410 (called a row-close) because the row access had destroyed the row's data in the memory bank. Then, a row access is performed to load the requested row into the row-buffer. Finally, a column access is performed. Note that this case has much higher latency than a row hit memory access due to the additional reads and writes required.
3. "Row Closed" Memory Access Request: There is no row in the row-buffer. Due to various reasons (e.g. to save energy), DRAM memory controllers sometimes close an open row in the row-buffer, leaving the row-buffer empty. In this case, the required row needs to be first loaded into the row-buffer (called a row access). Then, a column access is performed.

Due to the nature of DRAM bank organization, sequential accesses to the same row in the bank have low latency and can be serviced at a faster rate. However, sequential accesses to different rows in the same bank result in high latency. Therefore, to maximize bandwidth, conventional DRAM controllers typically schedule accesses to the same row in a bank before scheduling the accesses to a different row even if those were generated earlier in time.

Figure 5:
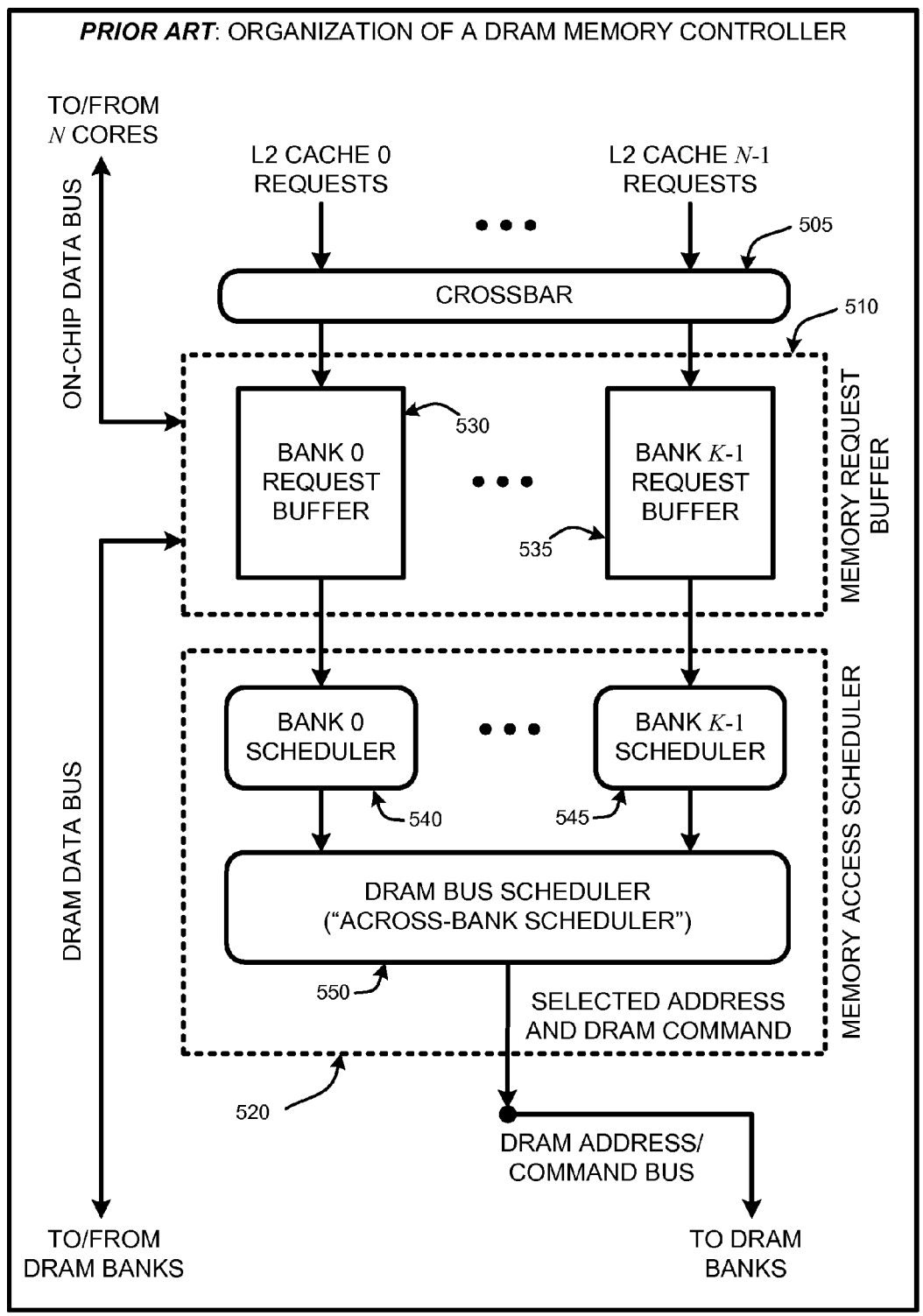
FIG. 5 illustrates prior art example of a simplified general architecture of a typical memory controller for use with DRAM type shared memory.

2.2.3 DRAM Memory Controller:

A conventional DRAM controller (or more generally, the "memory controller") is the mediator between the on-chip caches and the off-chip DRAM memory. It receives read/write requests from L2 caches. The addresses of these requests are at the granularity of the L2 cache block. FIG. 5 illustrates a simplified general architecture of a typical memory controller for use with DRAM type shared memory. The main components of the memory controller are a memory request buffer 510 and a memory access scheduler 520, as shown in FIG. 5.

In general, the memory request buffer 510 buffers the requests received via a crossbar 505 or the like that routes memory requests to the correct bank request buffer (530, 535). Note that in various embodiments, there may be a separate bank request buffer (530, 535) corresponding to each memory bank of the shared memory, or there may be a single request buffer maintaining the memory requests for all banks. Each entry in a bank request buffer (530, 535) contains an address (row and column), a type (read or write), a timestamp, and a state of the request along with storage for the data associated with the request.

In general, the main function of the memory access scheduler 520 is to select a memory request from the memory request buffers (530, 535) to be sent to the DRAM memory banks. As illustrated in FIG. 5, in one embodiment, the memory access scheduler 520 has a two-level hierarchical organization; alternately, it could consist of a single level. The first level includes separate per-bank schedulers (540, 545) corresponding to each individual memory bank of the shared memory. Each bank scheduler (540, 545) keeps track of the state of its corresponding bank and selects the highest-priority request from its corresponding bank request buffer (530, 535). The second level of the memory access scheduler 520 includes a DRAM bus scheduler 550 (also referred to as an "across-bank scheduler") that selects the highest-priority request among all the requests selected by the bank schedulers (540, 545). When a request is scheduled by the memory access scheduler, its state is updated in the bank request buffer (530, 535), and it is removed from the buffer when the request is served by the bank (for simplicity, these control paths are not illustrated in FIG. 5).

2.2.4 Conventional Memory Request Scheduling Techniques:

Conventional memory access schedulers are generally designed to maximize the bandwidth (that is, the number of requests serviced per time unit) obtained from the DRAM memory (or other shared system level memory). Typically, as is well known to those skilled in the art, a simple request scheduling algorithm that serves requests based on a first-come-first-serve (FCFS) policy is prohibitive, because it incurs a large number of bank conflicts, which cause more latency. Instead, many conventional memory access schedulers employ what is referred to as a "First-Ready First-Come-First-Serve" (FR-FCFS) algorithm to select which request should be scheduled next. This algorithm prioritizes requests in the following order in a particular memory bank:

1. "Row-Hit-First": The bank scheduler for a particular memory bank gives higher priority to the requests that can be serviced faster. In other words, a request that would result in a row hit is given priority over one that would cause a row conflict.
2. "Oldest-Request-First": In general, after prioritizing based on the row-hit-first rule, each individual bank scheduler gives higher priority to the request that arrived earliest. Then, the across bank scheduler selects the request with the earliest arrival time among all the requests selected by individual bank schedulers.

In other words, conventional FR-FCFS-type scheduling algorithms attempt to maximize DRAM bandwidth by scheduling accesses that cause row hits first (regardless of when these requests have arrived) within a bank. Hence, streaming memory access patterns are prioritized within the memory system. The oldest row-hit request has the highest priority in the memory access scheduler. In contrast, the youngest row-conflict request has the lowest priority.

One unfortunate consequence of FR-FCFS-type scheduling is that when multiple threads share the DRAM system, the FR-FCFS scheduling policy tends to unfairly prioritize threads with high row-buffer locality (i.e., high row-buffer hit rate) over those with relatively low row-buffer locality due to the row-hit-first prioritization rule. Such systems also tend to unfairly prioritize memory-intensive threads over non-intensive ones due to the oldest-request-first prioritization rule. Consequently, even though FR-FCFS-based scheduling techniques generally achieve relatively high DRAM data throughput, these techniques may starve particular requests or entire threads for long periods of time while higher priority threads are being serviced, thereby causing thread unfairness and relatively low overall system throughput.

2.3 Request Scheduler Overview:

In general, the request scheduler described herein provides a configurable substrate for fairness and quality of service (QoS) in combination with high system throughput for servicing requests for multiple processing cores in a chip multiprocessor (CMP) system. However, as noted above, the request scheduler is also applicable for use in single core systems. This fairness, QoS and high system throughput is achieved by incorporating parallelism-awareness into scheduling decisions. These ideas are generally referred to herein as "Parallelism-Aware Batch-Scheduling" (PAR-BS).

PAR-BS includes two primary components. The first component is a "request batching" (BS), or simply "batching", component that groups a number of outstanding memory requests into a batch and ensures that all requests belonging to the current batch are serviced before the next batch is formed. Batching not only ensures fairness but also provides a convenient granularity (i.e., a batch) within which possibly thread-unfair but high-performance DRAM command scheduling optimizations can be performed.

As noted above, request batching is a technique for grouping outstanding DRAM (or other memory type) requests in the memory request buffer into batches. Once batched, all requests belonging to a current batch are scheduled before scheduling requests from a later batch or from non-batched requests. Consequently, the request scheduler avoids request re-ordering across batches by prioritizing requests belonging to the current batch over other requests.

Once all requests of a batch are serviced (i.e., when the batch is finished), a new batch is formed consisting of outstanding requests in the memory request buffer that were not included in the last batch. Consequently, by grouping requests into larger units according to their arrival time, batching (in contrast to FR-FCFS and other conventional request scheduling schemes) prevents request starvation at a very fine granularity and enforces steady and fair progress across all threads. At the same time, the formation of batches provides the flexibility to re-order requests within a batch to maximize exploitation of row-buffer locality and bank-parallelism without significantly disturbing thread-fairness.

The second component of the request scheduler is referred to as "parallelism-aware within-batch scheduling" (PAR). PAR generally operates to reduce the average stall time of threads within a batch (and hence increase CMP throughput) by trying to service each thread's requests in parallel in the memory banks of the shared memory.

Further, it should be noted that once requests have been batched, any desired scheduling techniques for scheduling the batched requests may be used. As such, scheduling techniques, such as the novel rank-based scheduling techniques described herein can be used, or any desired conventional scheduling technique may also be used to schedule the batched requests. In other words, within a particular batch, any memory request scheduling algorithm can be used, including, for example, FR-FCFS, FCFS, round robin, or the rank-based scheduling described herein.

2.4 Request Batching

As noted above, request batching groups memory requests into batches of requests that are serviced prior to non-batched requests. In one embodiment, batches are identified within the memory request buffer entry by setting a bit that indicates whether a particular request belongs to the current batch, or whether that request is not in the current batch. In a tested embodiment, this identification or "marking" of requests was implemented by setting the bit associated with batched requests to a value of "1" (or any other desired value to indicate that the particular request is in the current batch) while non-batched requests received a value of "0" (or any other desired value). Consequently, "marked" requests are in the current batch, while "unmarked" or "non-marked" requests are not in the current batch.

In various embodiments, batching of requests follows rules similar to the following:

1. Forming a New Batch: A new batch is formed when there are no marked requests left in the memory request buffer, i.e., when all requests from the previous batch have been completely serviced.
2. Request Marking: When forming a new batch, the request scheduler marks up to the "Marking-Cap" number of outstanding requests per bank for each thread, these marked requests then form the new batch. Note that a marking cap does not need to be specified, in which case, all outstanding requests are marked when a new batch is formed.

As noted above, the "Marking-Cap" is a system parameter that limits how many requests issued by a thread for a certain bank can be part of a batch. For example, assume a marking cap of five for a general-purpose computer having eight shared memory banks. Further, assume that there are six concurrent threads (all of which will be included in the current batch in this example), with each thread having anywhere from three to fifteen memory requests per thread in each bank. Then, when a batch is formed by the request scheduler, that batch will include up to five (i.e., the marking cap number) requests from each of the six threads for each of the eight memory banks. Therefore, in this example, the current batch will include a maximum of 30 requests for each memory bank (i.e., six threads times up to a maximum of five requests per thread). Requests from each thread are selected for inclusion in a batch based on age, with oldest requests in each thread being selected first.

Clearly, the value of the Marking-Cap can affect the servicing of threads and requests in those threads since the requests in a particular batch are serviced before non-batched requests. For example, if the Marking-Cap is large, the request scheduler could suffer from scheduling unfairness. In particular, if a non-memory-intensive thread issues a request that just misses the formation of a new batch, the request has to wait until all requests from the current batch to the same bank are serviced, which slows down the non-intensive thread. On the other hand, a small Marking-Cap can slow down memory-intensive threads (i.e., threads with many requests in the memory request buffer), since at most Marking-Cap requests per thread and per bank are included in a batch, with the remaining ones being postponed until the next batch. Another problem with setting a Marking-Cap too low is that as the size of the Marking-Cap decreases, the row-hit rate of threads with high inherent row-buffer locality will also decrease. Therefore, across a batch boundary, a marked row-conflict request is prioritized over an unmarked row-hit request. The shorter the batches (the smaller the Marking-Cap), the more frequently a stream of row-hit accesses can be broken in this way, which increases the requests' access time. Consequently, selection of appropriate batch sizes (i.e., appropriate Marking-Caps) is an important consideration.

2.4.1 Modifications to Memory Scheduler for Request Batching:

The request batching capabilities of the request scheduler component requires both hardware and logic to keep track of the number of marked requests in the current batch (in order to decide when the batch is finished, and when a new batch should be formed). For this purpose, two new registers are added to the memory controller:

1. A register (referred to herein as the "TotalMarkedRequests" or "TMR" register) that includes a counter or the like for keeping track of the total number of marked requests (i.e., currently batched requests) in the memory request buffer; and
2. A register (referred to herein as the "Marking-Cap" or "MC" register) that stores the system-configurable Marking-Cap value that controls the total number of requests per thread that are allowed in each batch.

In various embodiments, the MC register is updated by the system software (e.g., application, operating system, hypervisor, virtual machine monitor, etc.), or the hardware. Unless the system software or the hardware changes the value of this register (to allow more or fewer requests per thread per bank into the current batch), it remains constant. The TMR register is updated as illustrated with respect to the following three steps:

1. Initialization: At initialization time (i.e., reset or new batch formation), the TMR register is set to zero;
2. Batch Formation: When the TMR register is zero, a new batch of requests is formed, as described above. Up to Marking-Cap outstanding requests per bank for each thread are then marked for inclusion in the current batch. In particular, the "Marked-Bit" of these requests are set to "1" (as described in Section 2.4.2 with respect to FIG. 6), and the TMR register is set to a value that corresponds to the total number of marked requests. In various embodiments, the total number of marked requests is either counted once the current batch is formed, or the TMR register is simply incremented by one (beginning from zero) for each newly marked request.
3. Register Updates: When the across-bank scheduler selects a marked request to be scheduled, the TMR register is decremented by one. Whenever the TMR register reaches zero, the memory controller returns to Step 2 and form a new batch of requests.

The steps described above for implementing the logic for marking/batching of requests are only utilized when a new batch is formed, and can be implemented in various ways. For example, in one embodiment, the memory request buffer is organized as per-thread logical FIFO buffers, i.e., requests are stored in the order of their arrival. If the memory request buffer is organized in this fashion, the marking/batching logic can consist of a small finite-state machine (or set of finite state machines—one for each memory bank) that iterate through the buffer and mark (for each thread and each bank) the first Marking-Cap number of requests. Clearly, many additional embodiments are possible depending on the particular storage requirements and specific structure of the memory request buffer and memory type being addressed by the request scheduler.

2.4.2 Request Batching Example:

As noted above, in contrast to a conventional memory request buffer, a modified memory request buffer for use with the request scheduler keeps track of additional information not considered by conventional memory request buffers. In embodiments in which batching of requests is implemented, this additional information allows the request scheduler to keep track of whether or not a particular request has been assigned to a batch. In related embodiments, this additional information also includes the aforementioned "rank" that is associated with each request in a particular batch. Clearly, there are many ways a request could be represented in the memory request buffer. Therefore, for purposes of explanation, one such representation will be described below with respect to FIG. 6. Note that the representation of requests in the modified memory request buffer illustrated in FIG. 6 is not intended to limit the request scheduler either to the various fields illustrated, or to the order or names of the particular fields.

Figure 6:
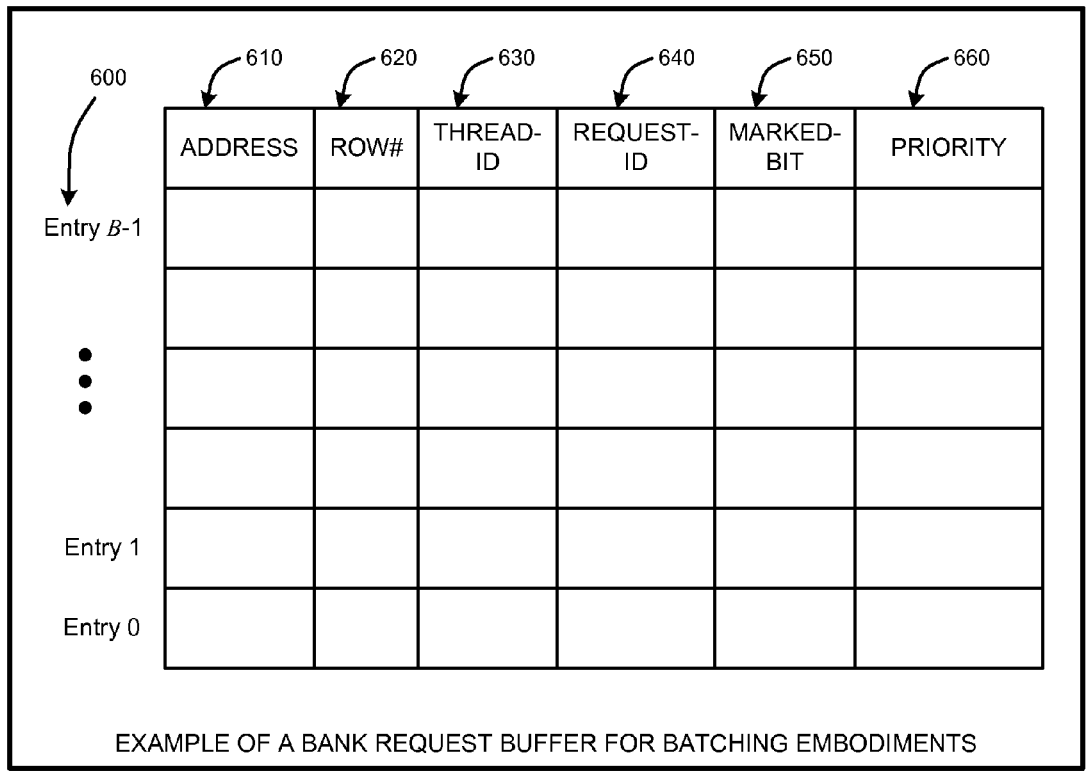
FIG. 6 illustrates a memory request buffer for individual memory banks of a shared memory system, as described herein.

In particular, as illustrated by FIG. 6, the memory request buffer for each individual memory bank holds some number of buffered requests 600 (e.g., memory request entries, 0 through B−1). Thus, the memory request buffer can be implemented for these entries 600 with the following identifiers as an example:

1. An "Address" 610 which is the simply the address of the particular memory request entry 600 (e.g., entries 0, . . . , B−1);
2. A "Row #" 620 which is simply the particular row of memory referenced by the Address 610 of each particular entry 600;
3. A "Thread-ID" 630 indicating the ID of the thread that generated the request entry 600;
4. A "Request-ID" 640 indicating the age of the request (used to decide which request is older). Note that subsequent requests in a thread are typically assigned subsequent request ID's. Therefore, lower request-ID's indicate older requests;
5. A "Marked-Bit" 650 that is set to "1" if the request is part of the current batch, and "0" otherwise; and
6. A "Priority Score" 660 that encodes a score used for prioritizing selection of batched requests. As noted above, in one embodiment, this priority score is based on the computed rank of each thread according to the ranking rules described in further detail below. However, other prioritization techniques may be used to provide a priority score or the like for use in scheduling the batched requests. In any case, the request scheduler uses the priority score 660 to determine which request is to be scheduled next, as described in further detail below.

It should also be noted that rather than "marking" individual requests in the request buffer as being included in the current batch for a particular bank, a separate "batch buffer" or the like may also be used to store batched requests. In this embodiment, requests are simply prioritized in the batch buffer rather than prioritizing marked requests in the request buffer. Consequently, in either case, operation of the request scheduler is similar. However it has been observed that overall efficiency may be increased by using only the single buffer (per bank) having an additional field for indicating whether a particular request is in the current batch rather than reading requests from the request buffer and writing them to the batch buffer.

As noted above, scheduling of batched requests can be accomplished using any desired scheduling technique, including the novel ranking based techniques described herein, or any other conventional scheduling technique desired. For example in the case of rank-based scheduling, the rank-based priority score is computed for each request in the memory request buffer.

Figure 7:
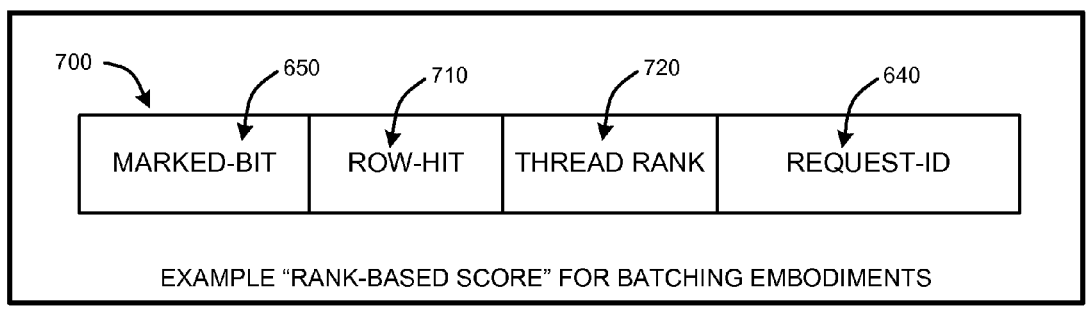
FIG. 7 illustrates an example of data used for constructing a rank-based score, as described herein.

For example, as illustrated by FIG. 7, one simple example of a rank-based priority (for populating the priority score 660 entry illustrated in FIG. 6) is determined, in part, based on the identifiers associated with each particular entry. In general, as illustrated by FIG. 7, a sequence of bits representing a rank-based score 700 is constructed, in part, from a subset of the identifiers listed in FIG. 6 in combination with a determination as to whether each request results in a row-hit or not. Note that as described in further detail below, the general concept is to provide a rank-based score, and FIG. 7 is only one example of a simple way to provide a rank-based score from the available data in the modified memory request buffer. The sequence of bits having the highest value corresponds to the highest priority, and the request with the highest priority is scheduled first.

In particular, FIG. 7 shows a sample priority value 700 where the first bit corresponds to the above-described "Marked-Bit" 650 in the memory request buffer, which is "1" if the particular request is in the current batch, or "0" otherwise. Clearly, in view of the preceding discussion, "marked" entries begin with a value of "1." Similarly, non-marked entries will begin with a value of "0." Therefore, it should be clear that all marked requests in the current batch will have a higher rank-based priority, and will be scheduled prior to any non-marked requests (i.e., all requests not in the current batch) in the memory request buffer.

Next, the "Row-Hit" entry 710 in the rank-based score 700 illustrated by FIG. 7 is "1" for row-hits, and "0" otherwise. Therefore, once it is determined that a particular request is in the current batch (i.e., a "1" in the marked-bit slot), then the next highest priority indicator is whether the current request is a row-hit or not. Again, this Row-Hit bit 710 is set based on the currently opened row in the bank, and the request's "Row#" field in the memory request buffer.

The "Thread Rank" entry 720 of the rank-based score stores the current rank of the thread associated with the request. As described in further detail below, this field can be set based on the request's "Thread-ID" and the thread ranking-logic described below.

Finally, "Request-ID" 640 corresponds to the Request-ID field in the memory request buffer illustrated in FIG. 6. As noted above, the Request-ID 640 is used to prioritize older requests over newer requests since the value of the Request-ID provides an indication of the relative ages of each of the requests, with higher request ID's corresponding to older requests.

2.4.3 Additional Batching Embodiments:

The batching method in PAR-BS can be referred to as full batching because it requires that a batch of requests be completed in full before the next batch is started. There are alternative ways to perform batching.

Time-Based Static Batching: In this embodiment, outstanding requests are marked periodically using a static time interval, regardless of whether or not the previous batch is completed. In other words, the existing batch is periodically replenished or filled up to the Marking-Cap number. In particular, in this embodiment, a system parameter "Batch-Duration" defines a time interval at which a new batch is formed, regardless of whether the current batch is empty. At the outset of a new batch, unmarked requests are marked subject to the Marking-Cap, while requests that are already marked from the previous batch remain so.

Empty-Slot Batching: In general, the request scheduler batches and/or schedules requests based on thread rankings. However, if a particular request arrives in the memory request buffer slightly after a new batch was formed, it may be delayed until the beginning of a new batch, causing a large stall time especially for a non-intensive thread. This particular problem is addressed by using an embodiment referred to herein as "Empty-Slot" batching. "Empty-Slot" batching attempts to alleviate the problem of large stall times across batches by allowing requests to be added to the current batch for particular threads if less than Marking-Cap requests from that thread for the specific bank were marked so far in this batch. In other words, if at the time a new batch is formed, a thread does not utilize its entire allotted share of marked requests (i.e. has "empty slots") within the batch, it is allowed to add late-coming requests to the batch until the threshold Marking-Cap is met.

However, it should be noted that this filling of empty slots does not continue unconstrained while the batch is being emptied by servicing the requests within that batch. Otherwise, batches might never be emptied in some cases, with the result that some threads might never be serviced. As such, in one embodiment, Empty Slot batching does not add more requests than the maximum number of remaining requests in any bank (with this number typically being the Marking-Cap number unless either no thread had many requests for any bank when the batch was formed, or batch servicing is underway and serviced requests have been cleared from the batch).

2.5 Ranking-Based Scheduling:

In general, the idea of thread ranking is to rank threads, and then to prioritize requests from higher-ranked threads over other requests, using the same ranking across all banks. As noted above, in various embodiments, ranking-based scheduling is applied to batched requests to provide improved intra-thread bank-level parallelism.

However, in view of the discussion provided herein, it should be clear that the rank-based scheduling techniques may also be applied to non-batched requests to improve conventional scheduling techniques, such as, for example FR-FCFS based scheduling techniques. In other words, given a conventional memory controller, such as a DRAM scheduler for example, ranking-based scheduling, without request batching, will improve overall thread-servicing in a multi-threaded environment by scheduling requests in the same order across all banks based on a previously computed thread-ranking.

Although conceptually many different ranking-based schemes enhance within-batch intra-thread bank-level parallelism (or intra-thread bank-level parallelism without batching), the specific ranking procedure has a significant impact on CMP throughput and fairness. For example, a good ranking scheme should effectively differentiate between memory-intensive and non-intensive threads (and threads with high bank-parallelism). If a non-intensive thread with few requests is ranked lower than an intensive thread, its requests may be overly delayed within a batch. Consequently, a fair memory scheduler should equalize the memory-related slowdown of each thread compared to when the thread is running alone on the same memory system.

As a non-intensive thread or a thread with high bank-parallelism inherently has a low memory-related stall-time when running alone, delaying its requests within a batch results in a much higher slowdown than it would for an intensive thread, whose memory-related stall-time is already high even when running alone. To avoid this unfairness (and loss of system throughput as explained below), one ranking technique enabled by the request scheduler is based on a "shortest job first" principle, which is described below in the context of a "Max-Total" rule. The Max-Total rule ranks non-intensive threads higher than intensive threads in the same batch (or memory request buffer in the case where batching is not applied).

Besides fairness, one important feature of the Max-Total rule is that it tends to reduce the average batch completion time of threads within a batch. In the classic single-machine job-scheduling problem and many of its generalizations, shortest-job-first scheduling is optimal in that it minimizes average job completion time. A thread's batch-completion time is the time between the beginning of a batch and the time the thread's last marked request from the batch is serviced. It directly corresponds to the thread's memory-related stall-time within a batch. By reducing the average batch-completion time, shortest job first scheduling improves overall system throughput as the threads stall less for memory requests, on average, thereby making faster progress in executing their instruction streams.

Figure 8:
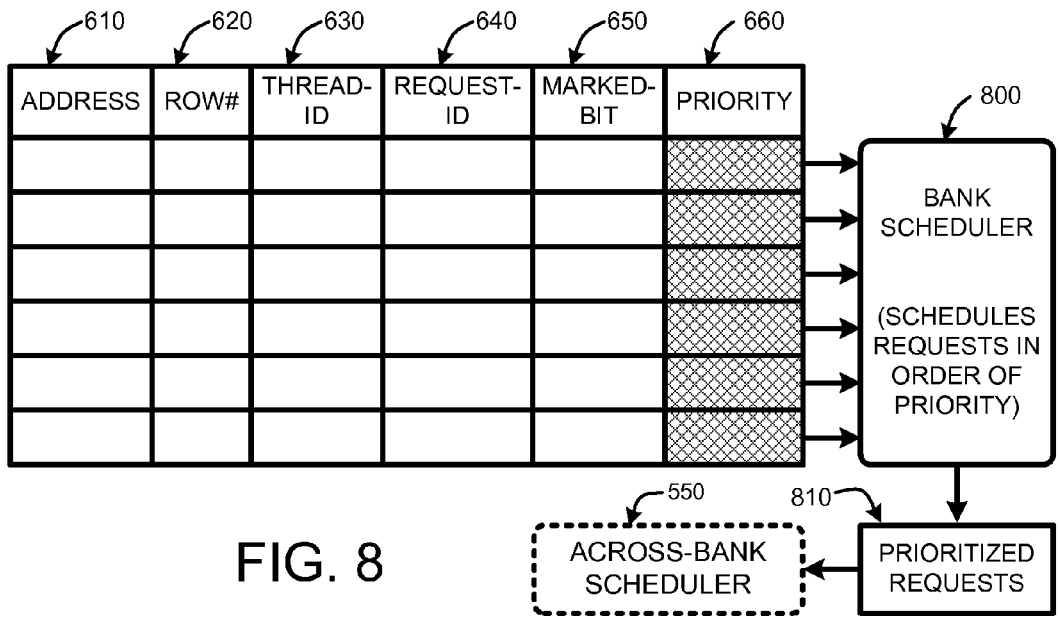
FIG. 8 illustrates an example of a simplified high-level implementation of one of the bank schedulers of request scheduler (with one bank scheduler per memory bank), as described herein.

2.5.1 Prioritization-Logic for Implementing the Request Scheduler:

FIG. 8 shows an example of a simplified high-level implementation of one of the bank schedulers of the request scheduler (with one bank scheduler per memory bank). Note that FIG. 8 illustrates an example with respect to the use of conventional DRAM-based memory banks. However, as noted above, the general batching and/or scheduling techniques described herein are applicable for use with many types of shared memory and is not intended to be limited to the use of DRAM-based shared memory.

Further, it should also be appreciated that the bank scheduler illustrated with respect to FIG. 8 is only one possible embodiment even in the case of DRAM, since many different implementations are possible due to the complex nature of various conventional DRAM memory controllers. In any case, the bank scheduler is implemented using a priority selector conceptually similar to the one used in standard FR-FCFS memory controllers that differs from those controllers with respect to the additional batching and scheduling techniques described herein. Further, in various embodiments, the described techniques can be directly applied to single-level memory schedulers that do not consist of separate bank schedulers and across bank schedulers.

In general, as illustrated by FIG. 8, each bank scheduler 800 receives as its input the priority score 660 values, discussed above with respect to FIG. 6 and FIG. 7, from the corresponding bank request buffer. The bank scheduler 800 then chooses one request at a time to be sent to the across-bank scheduler 550 (or directly to the DRAM bus, or other memory bus, in embodiments where there is no across-bank scheduler). In particular, the bank scheduler 800 uses priority selection logic to select the request with the highest priority from the bank request buffer.

For example, in one embodiment, the priority-selection logic of the bank scheduler prioritizes the requests in the following order, as described in further detail below:
1. Batch Status: Marked requests are prioritized over unmarked requests (i.e., batched requests are selected first);
2. "Row-Hit-First": After evaluating batch status, row-hit requests are prioritized over row-conflict or row-closed requests;
3. Thread Rank: After evaluating row-hit status, requests from threads with higher rank are prioritized over requests from threads with lower ranks; and
4. "Oldest-Request-First": After evaluating thread rank, older requests are prioritized over younger requests.

It should be noted that the second and forth elements of the priority selection logic shown above (i.e., "Row-Hit-First" and "Oldest-Request-First") are equivalent to the first two rules of conventional FR-FCFS scheduling which simply considers row-hit status then age, as discussed above in Section 2.2.4. The difference here is the use of batching and thread ranking, both of which are useable separately or in combination to improve conventional memory request scheduling.

Note that the priority selection logic of the batch selector can be implemented in various ways, either internally to the bank scheduler, or as an attached component. Further, the priority selection logic can be implemented using a "priority encoder," similar to those commonly used in conventional prioritization hardware by modifying the priority selection logic to consider batched requests and thread rankings. Note that the bank scheduler outputs the request-ID of the selected request so that it will be compatible with existing hardware such as conventional across-bank schedulers which accept request ID's as an input.

In particular, a conventional across-bank scheduler (e.g., the DRAM bus scheduler 550 illustrated in FIG. 5) takes in as inputs all request-ID's selected by the individual bank schedulers. The request scheduler described herein does not specifically define the across-bank scheduler, since any conventional across-bank scheduler can be used in combination with the request scheduler described herein. Consequently, many embodiments and implementations are possible. For example, in one simple embodiment, the across-bank scheduler always prioritizes the oldest request from among all requests that were selected by the individual bank schedulers. The selected request is then scheduled onto the memory bus for servicing, with the result being returned to the processor core that originated the request.

2.5.2 Implementation of Ranking-Based Scheduling:

Note that the following discussion will generally refer to batched requests for purposes of explanation. However, it should be understood that the thread ranking techniques described herein may be applied to requests in the memory request buffer without the use of batching. In general, ranking of threads can be determined using various ranking techniques. Typically, these techniques require either or both hardware and logic modifications relative to conventional bank schedulers.

Figure 9:
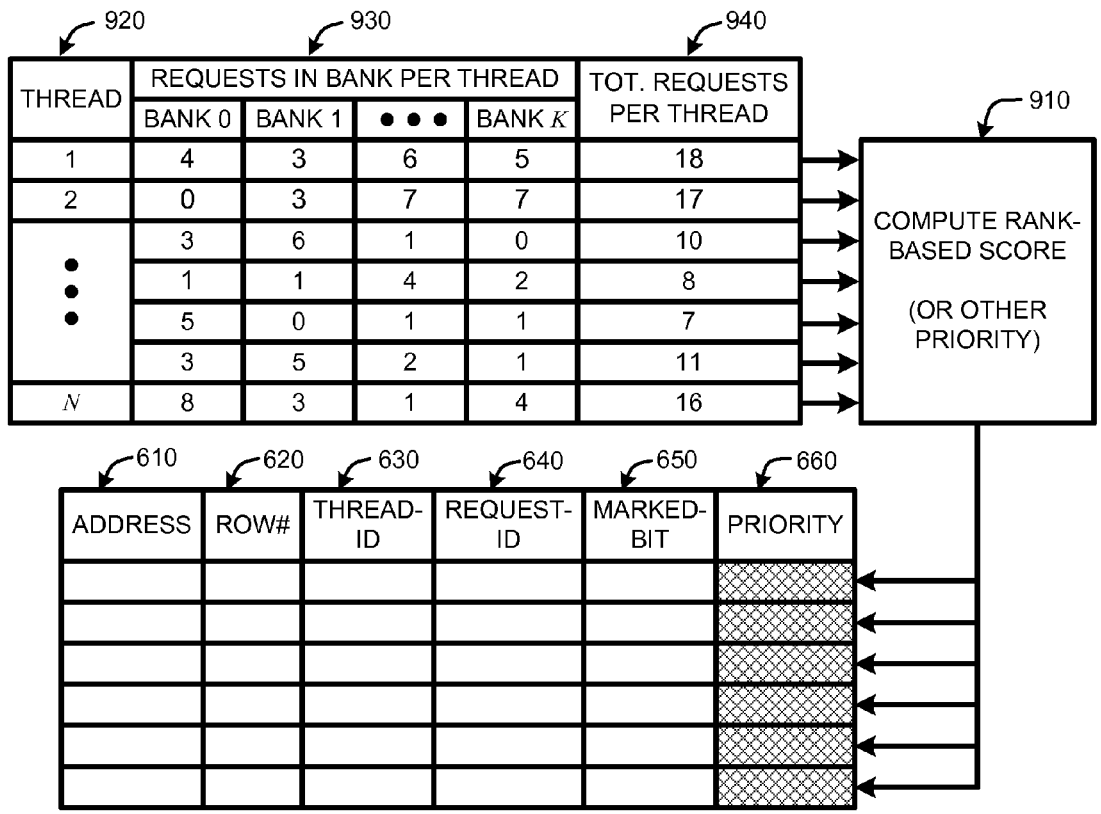
FIG. 9 illustrates a memory controller for implementing various embodiments of the request scheduler, as described herein.

For example, in one embodiment, ranking of threads (whether or not batched), requires both hardware and logic modifications to conventional memory controllers for implementation. More specifically, this embodiment uses a "Max-Rule" and a "Total-Rule" to compute thread rankings. In general, the Max-Rule keeps track of a number of outstanding requests in each bank for each thread, while the Total-Rule computes the total number of outstanding requests across all banks for each thread. For this purpose, two new registers are added to the memory controller, as illustrated by FIG. 9, as described below:

1. Requests in Bank per Thread Register: This register, referred to herein as the "ReqsInBankPerThread" register 930 is a register (or data storage area) added to the memory controller to keep track of the number of outstanding memory requests in the memory request buffer from a specific thread to a specific bank. For example, as illustrated by FIG. 9, "Thread 1" includes banks $(0, \ldots, K)$ with values of 4, 3, 6 and 5 requests per bank, respectively, meaning that Thread 1 has respectively 4, 3, 6, and 5 outstanding requests in each bank.
2. Total Requests per Thread Register: This register, referred to herein as the "TotReqsPerThread" register 940, is a register (or data storage area) added to the memory controller to keep track of the total number of requests across all banks for each particular thread. For example, as illustrated by FIG. 9, "Thread 1" includes banks $(0, \ldots, K)$ with values of 4, 3, 6 and 5 requests per bank, respectively. Consequently, the total number of requests for "Thread 1" is 18 (with this value populating the TotReqsPerThread register 940), which is simply the sum of requests per bank for "Thread 1" (i.e., 4+3+6+5=18).

In general, counters for setting the values for each of the two registers described above are updated whenever requests enter or leave the memory request buffer. More specifically, whenever a request is scheduled (and thus leaves the memory request buffer), both the TotReqsPerThread register and the ReqsInBankPerThread register of the corresponding thread and the corresponding bank are decremented by one. Conversely, when a new request enters the memory request buffer for a particular thread, the corresponding counters are incremented by one for the corresponding thread and the corresponding bank. Note that these counters for keeping track of the number of requests per bank for each thread and the total number of requests for each thread are incremented and decremented as requests are received or scheduled without the need to consider whether particular requests have been batched.

In one embodiment, termed "Max-Total Ranking" (also illustrated by FIG. 9), whenever a new thread ranking is computed, the request scheduler uses the values in the TotReqsPerThread register and the ReqsInBankPerThread register to compute a rank-based score 910. In general, in the "Max-Total Ranking" embodiment, the request scheduler computes rank using a two part evaluation of the data in the two registers (930 and 940). Note that the following two-part evaluation assumes that requests have been batched. However, even without batching, the same rules can be applied to all requests in the memory buffer at any desired interval. In particular, assuming that batching is applied, the Max-Total ranking is determined as follows:

1. "Max Load" Rule: For each thread 920, the request scheduler finds the maximum number of marked/batched requests in any given bank for each thread, called "max-bank-load." A thread with a lower max-bank-load is ranked higher than a thread with a higher max-bank-load. For example, as illustrated in FIG. 9, "Thread 1" has a maximum of 6 requests for any particular bank (i.e., the max-bank-load of "Thread 1" is 6.) Similarly, "Thread 2" has a max-bank-load of 7 requests, while "Thread $I$" has a max-bank-load of 8 requests. The max-bank-load is determined for each thread, then the threads are ranked in order of lowest max-bank-load to highest max-bank-load (e.g., in the above example, "Thread 1" would be ranked higher than "Thread 2" which would be ranked higher than "Thread $I$"). Further, as can be seen in FIG. 9, two of the threads each have a max-bank-load of 6 requests. In this case, a "Tie-Breaker Total" rule, as described below, is used to determine the relative ranking of those two threads.
2. "Tie-Breaker Total" Rule: For each thread 920, the request scheduler keeps track of the total number of marked/batched requests, called total-load. This number is represented by the value in the TotReqsPerThread register 940. Then, when threads are ranked the same based on the "Max Load" rule (such as the two threads having a max-bank-load of 6), the thread with a lower total-load 940 is ranked higher than a thread with a higher total-load. Consequently, "Thread 1" having 18 total requests (and a max-bank-load of 6) is ranked lower than the thread having 10 total requests (and a max-bank-load of 6) as illustrated in FIG. 9. Further, in accordance with the "Max Load" Rule described above, both of these threads having the max-bank-load of 6 will be ranked higher than "Thread 2" which has max-bank-load of 7.

For example, in a tested embodiment, the lowest thread rank was set to a value of zero, with the highest thread rank being set to a value corresponding to the total number of threads being ranked (i.e., a "Max-Rank" value). Therefore, assuming a total of $I$ threads, the threads will be ranked from 0 to $I-1$, with the thread having a rank of 0 being the lowest-rank thread, and the thread having a rank of $I-1$ being the highest-rank thread. Note that the maximum number of outstanding requests to any bank correlates with the "shortness of the job," i.e., with the minimal memory latency that is required to serve all requests from a thread if they were processed completely in parallel. Therefore, when implementing Max-Total ranking, highly-ranked threads have fewer marked requests going to the same bank and hence can be finished fast. Therefore, by prioritizing requests from such high-ranked threads within a batch, the request scheduler ensures that non-intensive threads or threads with high bank-parallelism make fast progress through the memory request buffer.

2.5.3 Additional Ranking Embodiments:

As noted above, the request scheduler includes a number of additional thread ranking embodiments that are applicable for use either with or without batching. Further, within a batch, many different alternative request/command prioritization techniques can be employed. For example, in addition to the Max-Total ranking method described above, another ranking embodiment termed the "Total-Max" rule is also used. In the Total-Max rule, the sub-rules used for evaluating the Max-Total rule are reversed. In other words, the Total-Max rule ranks threads by first applying the aforementioned "Tie-Breaker Total" rule such that threads having the lowest number of total requests across all banks are given the highest ranking-based priority. Ties (i.e., same number of total requests across all banks) are then addressed by giving higher priority to threads using the "Max Load" rule such that a thread with a lower max-bank-load is ranked higher than a thread with a higher max-bank-load (see Section 2.5.2 for additional details on these sub-rules).

For example, as discussed in Section 2.5.2 with respect to FIG. 9, the Max-Total rule would assign the highest priority to "Thread 2." However, in applying the Total-Max rule, the first step is to determine which thread has the lowest number of total requests. As illustrated by FIG. 9, one thread has total load of only 7 requests. As such, that thread will be given the highest rank. Further, in this case, "Thread 2" will be given the lowest rank since it has the highest number (22) of total requests per thread.

In another embodiment, a "round-robin" ranking approach is used. In particular, in the round-robin approach, the rank of each thread is alternated in a round-robin fashion in consecutive batches. New threads not previously ranked are assigned the lowest rank in each batch.

In further embodiments, threads are ranked based on age, with older threads being given higher priority over newer threads. Finally, in yet another embodiment, random ranking of threads in each batch is performed. It has been observed that random ranking of batched threads for scheduling also improves overall performance relative to conventional FR-FCFS based scheduling. As such, it should be clear that the batching itself provides a performance improvement for memory scheduling that is further improved by various within-batch scheduling techniques.

2.6 Additional Embodiments and Considerations:

The request batching and scheduling described above generally assumes that all threads have equal priority and, in terms of fairness, should experience equal memory-related slowdowns when run together. However, in various embodiments, "batching priorities" are assigned to one or more of the threads separately from the ranking (and ranking-based scores) described above. It is important to note here that these thread batching priorities are not the same as thread rankings, or the priority score computed from the thread rankings as discussed above in Section 2.4.

In particular, there are clearly some cases in which there may be very large numbers of concurrent threads, or where it is important that certain threads are serviced more quickly than other threads. Consequently, in various embodiments, the request scheduler prioritizes threads and includes requests from particular threads in one or more batches based on the batching priority associated with those threads. For example, if a particular thread has a very high batching priority, requests from that thread may be included in every batch. On the other hand, if a particular thread has a lower priority, requests from that thread may be included at some predetermined interval, such as, for example, every second, third, or fifth batch, depending on the particular batching priority of the thread.

In other words, in various embodiments, the request scheduler enforces thread batching priorities provided by the system software (e.g., application, operating system, hypervisor, virtual machine monitor, etc.) by adjusting "when" the batching is performed for threads with different priorities. Further, in various embodiments, a very low batching priority can be assigned to threads such that they will never be batched (and thus never scheduled) unless they will cause no interference with threads higher than some particular priority.

Clearly, thread batching priorities can be set or defined in a number of ways. For example, in one embodiment, the batching priority of each thread is sent to the request scheduler by the system software (e.g., application, operating system, hypervisor, virtual machine monitor, etc.). Batching priorities are assigned as priority-levels 1, 2, 3, . . . , where level 1 indicates the most important thread (highest priority) and a larger number indicates a lower batching priority. Equal-priority threads should be slowed down equally (i.e., batched less frequently, but at the same frequency). Further, the lower a thread's batching priority, the more tolerable its slowdown. The concept of thread batching priorities is incorporated into the request scheduler in various embodiments.

For example, in an embodiment referred to as "Priority-Based Marking," requests from a thread with batching priority X are marked only every $X^{th}$ batch. More specifically, requests from highest batching priority threads, with priority level 1, are marked for inclusion in every new batch, requests from threads with batching priority level 2 are marked every other batch, and so forth. The batching mechanism described above otherwise remains the same, i.e., a new batch is formed whenever there are no marked requests in the buffer.

In various embodiments, scheduling of batched requests is also changed by the use of thread priorities. Note that these thread priorities may be the same as the "thread batching priorities" described above, or can be a separate thread priority, if desired. For example, in an embodiment referred to herein "Priority-Based Within-Batch Scheduling," an additional "Priority" rule is added to the within-batch request prioritization rules described above in Section 2.5.1. In particular, instead of the four level set of rules described in Section 2.5.1, thread priority is captured in the new set of rules shown below. For example, in this case, the priority-selection logic of the bank scheduler prioritizes the requests in the following order, as described in further detail below:

1. Batch Status: Marked requests are prioritized over unmarked requests (i.e., batched requests are selected first)
2. "Thread Priority First": After evaluating batch status, higher priority threads are scheduled first. Again, it must be understood that this thread priority is not the same as the thread rankings or the priority score computed from the thread rankings as described above;
3. "Row-Hit-First": After evaluating thread priority, row-hit requests are prioritized over row-conflict or row-closed requests;
4. Thread Rank: After evaluating row-hit status, requests from threads with higher rank are prioritized over requests from threads with lower ranks; and
5. "Oldest-Request-First": After evaluating thread rank, older requests are prioritized over younger requests.

The effect of these two changes to the request scheduler is that higher-priority threads are naturally scheduled faster. In particular, requests from higher priority threads are batched more frequently. Then, once batched, the requests of the higher priority threads are scheduled before the requests of lower priority threads in the same batch.

In yet another embodiment, referred to herein as "Opportunistic Scheduling," the request scheduler provides a special priority level that indicates the lowest-priority threads. Requests from such threads are never marked while other threads are being serviced, and they are assigned the lowest priority among unmarked requests. Consequently, requests from threads at this special lowest priority level are scheduled purely opportunistically. More specifically, in various embodiments, the requests from such threads will only be scheduled if the memory system is free in order to minimize their disturbance on other threads. Consequently, it is possible that such threads may never be serviced if the general purpose computer is continuously busy servicing other higher priority threads.

In other words, in the Opportunistic Scheduling embodiment, if there is no request for a particular bank in the current batch, the request scheduler can select and service a request for that bank from the lowest priority threads in the memory request buffer. This mode of operation is likely to gain more importance in the future as it avoids interference of low-priority threads with other, higher-priority threads. For example, a background thread performing I/O operations (e.g. a virus checker) can be set to "opportunistic mode" so that the user's primary tasks (e.g., watching a video) do not get slowed down.

Figure 10:
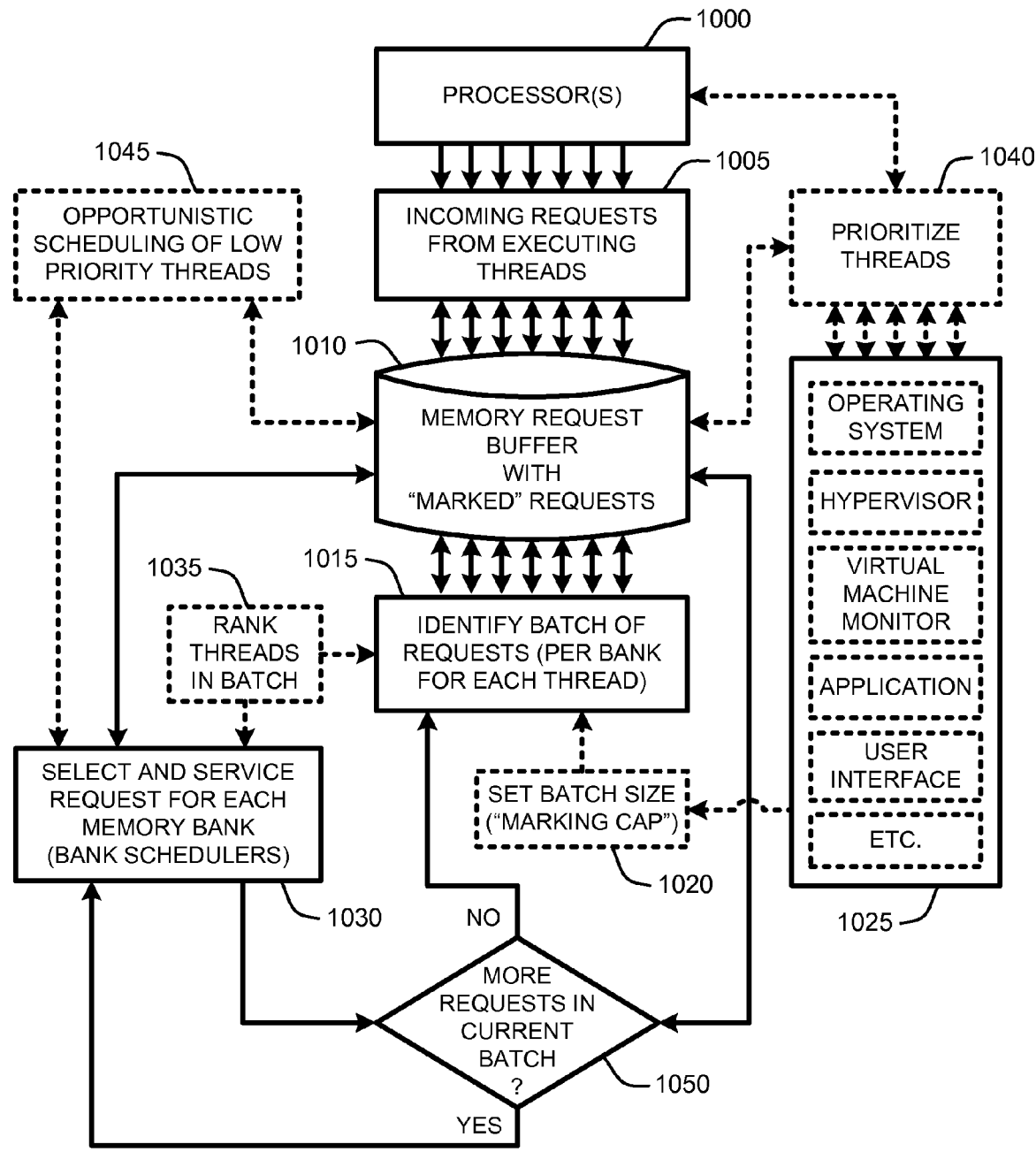
FIG. 10 illustrates a general system flow diagram that illustrates exemplary methods for implementing various embodiments of the request scheduler, as described herein.

3.0 Operational Summary of the Request scheduler:

The processes described above with respect to FIG. 1 through 9 and in further view of the detailed description provided above in Sections 1 and 2 are illustrated by the general operational flow diagram of FIG. 10. In particular, FIG. 10 provides an exemplary operational flow diagram that illustrates operation of several embodiments of the request scheduler. Note that FIG. 10 is not intended to be an exhaustive representation of all of the various embodiments of the request scheduler described herein, and that the embodiments represented in FIG. 10 are provided only for purposes of explanation.

Further, it should be noted that any boxes and interconnections between boxes that are represented by broken or dashed lines in FIG. 10 represent optional or alternate embodiments of the request scheduler described herein, and that any or all of these optional or alternate embodiments, as described below, may be used in combination with other alternate embodiments that are described throughout this document.

In general, as illustrated by FIG. 10, the request scheduler begins operation by receiving requests 1005 from threads executing on one or more processing cores 1000 of a general-purpose computer. Typically, each thread executing on a processor core continues to generate requests while that thread is active. Consequently, each of the incoming requests 1005 should be understood to be a dynamic chain of memory requests that continues until such time as the thread is terminated. The incoming requests 1005 associated with each executing thread are then stored in a memory request buffer 1010 until such time as the request is serviced, at which time, the request is removed from the memory request buffer.

Once requests enter the memory request buffer 1010, the request scheduler identifies 1015 a batch of requests from the memory request buffer. As discussed above, each batch includes requests for either some or all active threads up to some maximum number of requests per bank for each thread. This maximum number is referred to herein as the "marking cap," which is set 1020 by the system software 1025. For example, as discussed above, if a particular thread has seven requests for a particular bank, and the marking cap is set at five, then only the first five requests from that thread for that particular bank are "marked" for inclusion in the current batch.

Once a batch has been identified 1015 (i.e., the requests for the current batch have been "marked" in the memory request buffer 1010), the request scheduler then begins to service the batched requests by scheduling 1030 those requests in the current batch by using separate bank schedulers for the requests associated with each bank of the shared memory. Note that batched requests are generally serviced prior to non-batched requests. However, in various embodiments, such as the "empty-slot batching" embodiment described in Section 2.4.3, or the "opportunistic scheduling" 1045 embodiment described in Section 2.6, non-batched requests may also be scheduled in order to further optimize system performance.

In addition, with respect to scheduling 1030 of requests, in various embodiments, the request scheduler ranks 1035 the threads in each batch in order to control the servicing order of those threads for improving intra-thread bank-level parallelism. In other embodiment, threads are prioritized 1040 with a batching priority that controls how frequently particular threads will be included in new batches. For example, threads with the highest batching priority will be included in every new batch of requests, while threads having lower priorities will be included in only a subset of the new batches, depending on the particular batching priority associated with each thread. In general, the batching priorities are set 1040 via the system software 1025.

Scheduling 1030 of threads continues 1050 until there are no more requests in the current batch, at which time a new batch is formed by identifying 1015 a new batch of requests per bank for each thread.

Finally, it should again be noted that the various embodiments described above with respect to FIG. 10 represent only a small subset of the various embodiments of the request scheduler described herein.

Figure 11:
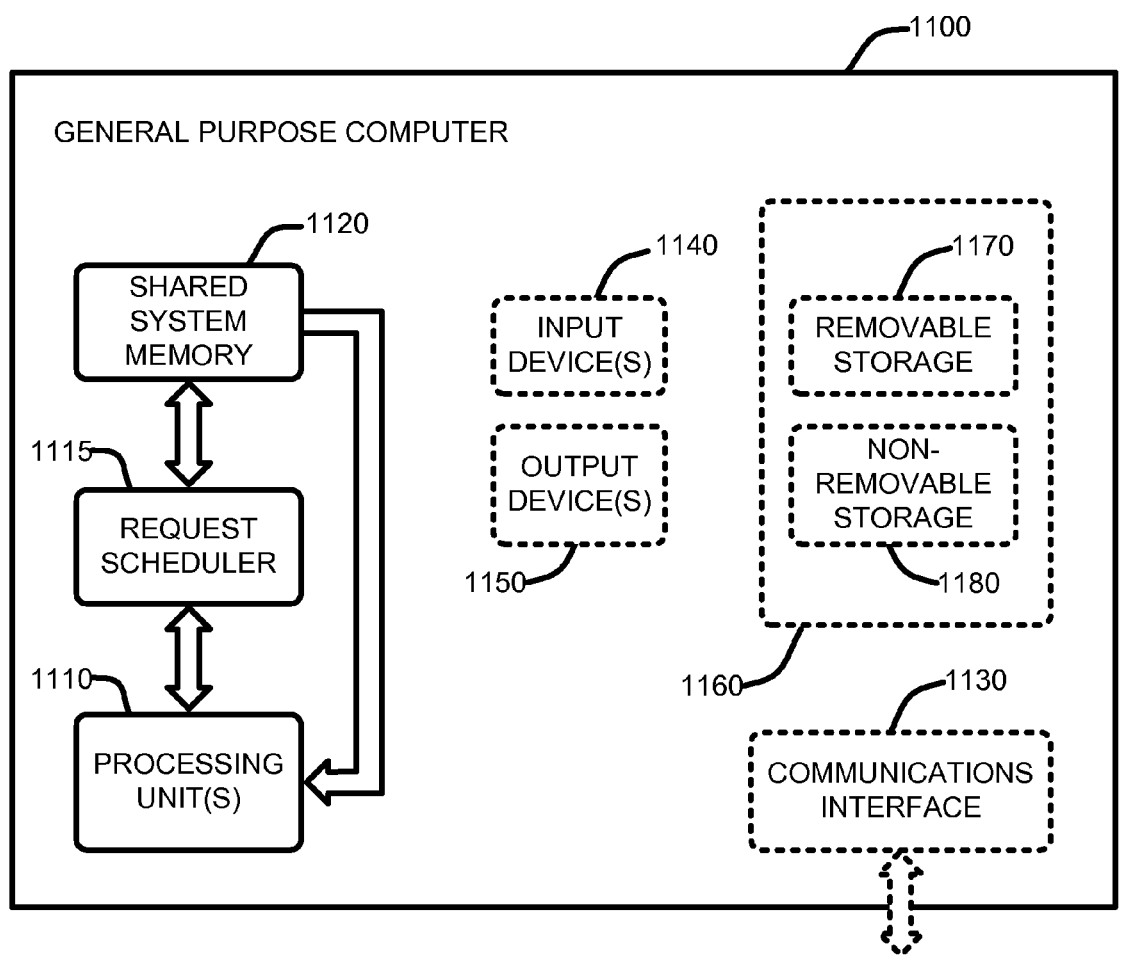
FIG. 11 is a general system diagram depicting a request scheduler in a simplified general-purpose computing device having simplified computing and I/O capabilities for use in implementing various embodiments of the request scheduler, as described herein.

4.0 Exemplary Operating Environments:

The request scheduler is operational within numerous types of general purpose or special purpose computing system environments or configurations. FIG. 11 illustrates a simplified example of a general-purpose computer system having shared memory on which various embodiments and elements of the request scheduler, as described herein, may be implemented. It should be noted that any boxes that are represented by broken or dashed lines in FIG. 11 represent alternate embodiments of the simplified computing device, and that any or all of these alternate embodiments, as described below, may be used in combination with other alternate embodiments that are described throughout this document.

For example, FIG. 11 shows a general system diagram showing a simplified computing device. Such computing devices can be typically be found in devices having at least some minimum computational capability and a shared memory system, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, dedicated media players (audio and/or video), etc.

At a minimum, to allow a device to implement the request scheduler, the device must have some minimum computational capability that addresses some shared system level memory having memory banks that can be serviced in parallel. In particular, as illustrated by FIG. 11, the computational capability is generally illustrated by one or more processing unit(s) 1110 that are coupled to shared system level memory via the request scheduler 1115 which performs the functionality of a memory controller, as described herein.

Note that that the processing unit(s) 1110 of the general computing device of may be specialized microprocessors, such as a DSP, a VLIW, or other micro-controller, or can be CPUs having one or more cores, such as, for example, AMD® processors such as Athlon®, Turion®, Opteron®, etc., Intel® processors, such as Pentium-D®, Core Duo®, Xeon®, etc., IBM® processors such as the Power 4/5 series processors, etc. In other words, any processor (having one or more cores) that address shared system level memory, such as DRAM, SRAM, flash memory, or any other type of shared system level memory, is applicable for use with the request scheduler 1115 described herein. Further, the request scheduler 515 can be either integrated into the processor, or can be a separate attached component. In either case, functionality of the request scheduler is generally the same.

In addition, the simplified computing device of FIG. 11 may also include other components, such as, for example, a communications interface 1130. The simplified computing device of FIG. 11 may also include one or more conventional computer input devices 1140. The simplified computing device of FIG. 11 may also include other optional components, such as, for example one or more conventional output devices 1150. Finally, the simplified computing device of FIG. 11 may also include storage 1160 that is either removable 1170 and/or non-removable 1180. Note that typical communications interfaces 1130, input devices 1140, output devices 1150, and storage devices 1160 for general-purpose computers are well known to those skilled in the art, and will not be described in detail herein.

The foregoing description of the request scheduler has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the request scheduler. It is intended that the scope of the invention be limited not by this detailed description, but rather by the claims appended hereto.

What is claimed is:

1. A memory controller for scheduling thread requests in a general-purpose computer system, comprising:
    a memory request buffer for receiving and buffering a plurality of thread requests from a plurality of concurrent threads on an ongoing basis;
    a device for assigning a priority to each thread;
    a device for determining a priority level of each request based on the priority of each corresponding thread;
    a memory scheduler for determining a servicing order of the requests to access shared memory of the general-purpose computer;
    wherein the shared memory comprises a plurality of separate memory banks; and wherein the servicing order of the requests is determined as a function of the priority level of each request.

2. The memory controller of claim 1 further comprising determining a ranking score for each thread.

3. The memory controller of claim 2 wherein the priority that is assigned to each thread is computed from the ranking score of each thread.

4. The memory controller of claim 3 wherein computing the ranking of each thread comprises ranking threads based on the maximum number of requests for any memory bank.

5. The memory controller of claim 3 wherein computing the ranking of each thread comprises ranking threads based on the total number of requests for all memory banks.

6. The memory controller of claim 3 wherein threads having a same maximum number of requests to any memory bank are ranked relative to each other by ranking threads having a smaller total number of requests for all memory banks higher than threads having a larger total number of requests for all memory banks.

7. The memory controller of claim 1 wherein the priority assigned to any of the threads is assigned by software of the general-purpose computer system.

8. The memory controller of claim 1 wherein determining the servicing order of the requests further comprises:
    first scheduling requests having row-hits over requests having row-conflicts;
    then scheduling requests from higher priority threads over requests from lower priority threads; and
    then scheduling oldest requests over newer requests.

9. The memory controller of claim 1 wherein one or more of the plurality of concurrent threads are assigned a special priority value such that the corresponding requests are never prioritized over requests from other threads that are not assigned the special priority value.

10. A system for controlling scheduling of memory requests of concurrent threads in a general-purpose computer having shared memory which includes a plurality of memory banks, comprising:
    a device for receiving a plurality of requests from a plurality of corresponding concurrent threads on an ongoing basis;
    a device for buffering the requests in a memory request buffer on an ongoing basis;
    a device for assigning a priority to each of the threads;
    a device for determining a priority level of each request based on the priority of each corresponding thread; and
    a device for scheduling an order of servicing of the buffered requests from memory banks of the shared memory based on the priority level of each request.

11. The system of claim 10 further comprising a device for determining a ranking corresponding to each thread, and wherein the priority of each thread is computed from the ranking of each thread.

12. The system of claim 11 wherein the ranking of each thread is determined by ranking threads based on the maximum number of requests for any memory bank.

13. The system of claim 11 wherein the ranking of each thread is determined by ranking threads based on the total number of requests for all memory.

14. The system of claim 10 wherein one or more of the threads are assigned a special priority value that prevents any corresponding requests from being serviced at any time that will interfere with any requests of higher priority threads.

15. The system of claim 10 further comprising a device for periodically identifying a subset of the buffered requests to periodically construct a current batch of thread requests, said current batch having a higher priority for scheduling than any other requests in the memory request buffer regardless of the corresponding thread priority of those requests.

16. The system of claim 15 wherein scheduling the order of servicing of the buffered requests further comprises:
    first scheduling requests in the current batch over all other requests;
    then scheduling requests having row-hits over requests having row-conflicts;
    then scheduling requests from higher priority threads over requests from lower priority threads; and
    then scheduling oldest requests over newer requests.

17. A method for scheduling requests of concurrent threads in a general-purpose computer system having shared memory including a plurality of memory banks, comprising steps for:
    executing a plurality of concurrent threads on one or more processing cores of the general-purpose computer system on an ongoing basis, each thread generating one or more memory requests for access to a corresponding location of one of the plurality of memory banks;
    buffering the memory requests in a memory request buffer;
    assigning a priority to each thread;
    determining a priority level of each of the buffered memory requests based on the priority of each corresponding thread;
    scheduling the buffered memory requests based on the priority of the corresponding threads and on the priority level of each request.

18. The method of claim 17 further comprising steps for determining a rank order for each thread, and wherein the priority of each thread is computed from the rank order of each thread.

19. The method of claim 18 wherein the rank order of the threads is determined by ranking threads having a smaller maximum number of requests for any memory bank higher than threads having a larger maximum number of requests for any memory bank.

20. The method of claim 18 wherein threads having a same maximum number of requests to any memory bank are ranked relative to each other by ranking threads having a smaller total number of requests for all memory banks higher than threads having a larger total number of requests for all memory banks.

* * * * *